(12) United States Patent
Huang et al.

(10) Patent No.: US 11,106,203 B2
(45) Date of Patent: Aug. 31, 2021

(54) SYSTEMS AND METHODS FOR AUGMENTED STEREOSCOPIC DISPLAY

(71) Applicant: SZ DJI TECHNOLOGY CO., LTD., Shenzhen (CN)

(72) Inventors: Zhicong Huang, Shenzhen (CN); Cong Zhao, Shenzhen (CN); Shuo Yang, Shenzhen (CN); Yannan Wu, Shenzhen (CN); Kang Yang, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/278,042

(22) Filed: Feb. 15, 2019

(65) Prior Publication Data

US 2019/0220002 A1    Jul. 18, 2019

Related U.S. Application Data

(63) Continuation of application No. PCT/CN2016/095841, filed on Aug. 18, 2016.

(51) Int. Cl.
*G06F 3/0483* (2013.01)
*G05D 1/00* (2006.01)
(Continued)

(52) U.S. Cl.
CPC ......... *G05D 1/0038* (2013.01); *B64C 39/024* (2013.01); *G01B 11/14* (2013.01);
(Continued)

(58) Field of Classification Search
CPC .... G05D 1/0038; G05D 1/0016; G06T 7/593; H04N 13/204; H04N 13/332;
(Continued)

(56) References Cited

U.S. PATENT DOCUMENTS

2008/0144925 A1\* 6/2008 Zhu .................. G06K 9/32
382/154
2010/0004798 A1   1/2010 Bodin et al.
(Continued)

FOREIGN PATENT DOCUMENTS

CN      101540020 A    9/2009
CN      102395997 A    3/2012
(Continued)

OTHER PUBLICATIONS

The World Intellectual Property Organization (WIPO) International Search Report and Written Opinion for PCT/CN2016/095841 dated Apr. 28, 2017 8 pages.
(Continued)

*Primary Examiner* — Jin Ge
(74) *Attorney, Agent, or Firm* — Anova Law Group, PLLC

(57) ABSTRACT

A method for generating a first person view (FPV) of an environment includes, with aid of one or more processors individually or collectively, analyzing stereoscopic video data of the environment to determine environmental information and generating augmented stereoscopic video data of the environment by fusing the stereoscopic video data and the environmental information.

20 Claims, 19 Drawing Sheets

(51) Int. Cl.

| | |
|---|---|
| *H04N 13/156* | (2018.01) |
| *H04N 13/332* | (2018.01) |
| *G01C 23/00* | (2006.01) |
| *G06F 3/01* | (2006.01) |
| *H04N 13/122* | (2018.01) |
| *G06F 3/0484* | (2013.01) |
| *G06F 1/16* | (2006.01) |
| *H04N 13/204* | (2018.01) |
| *H04N 13/344* | (2018.01) |
| *G06K 9/00* | (2006.01) |
| *G06T 7/593* | (2017.01) |
| *G06T 7/70* | (2017.01) |
| *B64C 39/02* | (2006.01) |
| *G01B 11/14* | (2006.01) |
| *G01B 11/22* | (2006.01) |
| *G06K 9/62* | (2006.01) |
| *H04N 13/00* | (2018.01) |
| *H04N 5/217* | (2011.01) |
| *H04N 13/239* | (2018.01) |
| *H04N 5/232* | (2006.01) |
| *H04N 5/357* | (2011.01) |
| *H04N 13/194* | (2018.01) |

(52) U.S. Cl.
CPC .............. *G01B 11/22* (2013.01); *G01C 23/00* (2013.01); *G05D 1/0016* (2013.01); *G06F 1/163* (2013.01); *G06F 3/011* (2013.01); *G06F 3/0483* (2013.01); *G06F 3/04842* (2013.01); *G06K 9/00671* (2013.01); *G06K 9/6202* (2013.01); *G06K 9/6267* (2013.01); *G06T 7/593* (2017.01); *G06T 7/70* (2017.01); *H04N 13/122* (2018.05); *H04N 13/156* (2018.05); *H04N 13/204* (2018.05); *H04N 13/332* (2018.05); *H04N 13/344* (2018.05); *B64C 2201/146* (2013.01); *G06T 2207/10021* (2013.01); *G06T 2207/10032* (2013.01); *G06T 2207/20024* (2013.01); *G06T 2207/20221* (2013.01); *G06T 2207/30261* (2013.01); *H04N 5/217* (2013.01); *H04N 5/232939* (2018.08); *H04N 5/3572* (2013.01); *H04N 13/194* (2018.05); *H04N 13/239* (2018.05); *H04N 2013/0081* (2013.01)

(58) Field of Classification Search
CPC ..... H04N 13/156; B64C 39/024; G06F 3/011; G06F 1/163; G06F 3/0483; G06F 3/04842; G06K 9/00671; G06K 9/6202; G06K 9/6267; G01B 11/22; G01B 11/14
USPC ........................................................ 345/633
See application file for complete search history.

(56) References Cited

U.S. PATENT DOCUMENTS

| | | | | |
|---|---|---|---|---|
| 2010/0208033 | A1* | 8/2010 | Edge | G06F 3/012 348/46 |
| 2012/0237114 | A1* | 9/2012 | Park | G06T 7/593 382/154 |
| 2012/0269384 | A1* | 10/2012 | Jones | G06K 9/00201 382/103 |
| 2014/0285623 | A1* | 9/2014 | Bruls | G06T 5/002 348/43 |
| 2015/0234189 | A1* | 8/2015 | Lyons | G02B 27/0172 345/174 |
| 2015/0304630 | A1* | 10/2015 | Wu | G06T 7/20 348/44 |
| 2015/0348270 | A1 | 12/2015 | Branz et al. | |
| 2016/0054737 | A1* | 2/2016 | Soll | G11B 27/031 701/3 |
| 2016/0070265 | A1* | 3/2016 | Liu | B64C 39/024 701/3 |
| 2016/0076892 | A1* | 3/2016 | Zhou | G01C 21/165 701/3 |
| 2016/0314373 | A1* | 10/2016 | Schoenberg | G06K 9/46 |
| 2017/0039765 | A1* | 2/2017 | Zhou | G06T 7/55 |
| 2017/0041557 | A1* | 2/2017 | Urich | G11B 27/036 |
| 2017/0116776 | A1* | 4/2017 | Aughey | G06T 19/00 |
| 2017/0251181 | A1* | 8/2017 | Smolyanskiy | G05D 1/005 |
| 2017/0337826 | A1* | 11/2017 | Moran | G05D 1/0088 |
| 2018/0046187 | A1* | 2/2018 | Martirosyan | G05D 1/0094 |
| 2018/0048827 | A1* | 2/2018 | Seydoux | G05D 1/0094 |
| 2018/0095459 | A1* | 4/2018 | Bachrach | G05D 1/0016 |
| 2019/0122442 | A1* | 4/2019 | Chen | G06T 17/20 |

FOREIGN PATENT DOCUMENTS

| | | |
|---|---|---|
| CN | 102665489 A | 9/2012 |
| CN | 104185857 A | 12/2014 |
| CN | 104903915 A | 9/2015 |
| CN | 105222761 A | 1/2016 |
| CN | 105492985 A | 4/2016 |
| CN | 105759833 A | 7/2016 |
| WO | 2015090420 A1 | 6/2015 |

OTHER PUBLICATIONS

Andrew J. Barry et al., Pushbroom Stereo for High-Speed Navigation in Cluttered Environments, Jul. 26, 2014, 6 pages.

M Sanfourche et al., Perception for UAV: Vision-Based Navigation and Environment Modeling, AerospaceLab, Aug. 10, 2012, pp. 1-19, Issue 4.

Andrew Barry, et al., Pushbroom Stereo for High-Speed Navigation in Cluttered Environments, 2015 IEEE International Conference on Robotics and Automation (ICRA), May 2015.

\* cited by examiner

Part A

Part B

SYSTEMS AND METHODS FOR AUGMENTED STEREOSCOPIC DISPLAY

CROSS-REFERENCE TO RELATED APPLICATION

This application is a continuation of International Application No. PCT/CN2016/095841, filed on Aug. 18, 2016, the entire contents of which are incorporated herein by reference.

BACKGROUND

User interfaces comprising first person view (FPV) images or video can provide an interactive and immersive user experience. In some cases, FPV images or video can be rendered on a binocular vision display device. A user who is operating an unmanned aerial vehicle (UAV) through a FPV on the display device may achieve an experience similar to that of flying the vehicle in the air. In some cases, when wide-angle lens are used to capture FPV images or video, perspective distortion can occur, which may affect a user's perception of distances between objects in a physical environment, and potentially compromise flight safety during operation of the UAV.

SUMMARY

A need exists for FPV flight control and guidance systems that are intuitive and easy to use, and that allows a user to safely manage and operate an aerial vehicle through interaction with a human-system interface. The present disclosure addresses this need and provides related advantages as well.

In one aspect of the disclosure, a method for generating a first person view (FPV) of an environment is provided. The method may comprise: with aid of one or more processors individually or collectively: analyzing stereoscopic video data of the environment to determine environmental information; and generating augmented stereoscopic video data of the environment by fusing the stereoscopic video data and the environmental information.

An apparatus for generating a first person view (FPV) of an environment is provided in accordance with an aspect of the disclosure. The apparatus may comprise one or more processors that are individually or collectively configured to: analyze stereoscopic video data of the environment to determine environmental information; and fuse the stereoscopic video data and the environmental information, to thereby generate augmented stereoscopic video stream of the environment.

In another aspect of the disclosure, a non-transitory computer-readable medium storing instructions that, when executed, causes a computer to perform a method for generating a first person view (FPV) of an environment is provided. The method as performed by the computer may comprise: analyzing stereoscopic video data of the environment to determine environmental information; and fusing the stereoscopic video data and the environmental information, thereby generating augmented stereoscopic video data of the environment.

In a further aspect of the disclosure, a method for displaying information of an environment is provided. The method may comprise: displaying, on a terminal remote to a movable object, a first person view (FPV) of the environment based on augmented stereoscopic video data, wherein the augmented stereoscopic video data is generated by incorporating: (a) stereoscopic video data generated by the movable object while operating in the environment, and (b) environmental information.

An apparatus for displaying information of an environment is provided in another aspect of the disclosure. The apparatus may comprise: a terminal remote to a movable object, the terminal configured to display a first person view (FPV) of the environment based on augmented stereoscopic video data, wherein the augmented stereoscopic video stream is generated by fusing: (a) stereoscopic video data generated by the movable object while operating in the environment, and (b) environmental information.

An apparatus for displaying information of an environment is provided in yet another aspect of the disclosure. The apparatus may comprise one or more processors that are, individually or collectively, configured to: display, on a terminal remote to a movable object, a first person view (FPV) of the environment based on augmented stereoscopic video data, wherein the augmented stereoscopic video data is generated by fusing: (a) stereoscopic video data generated by the movable object while operating in the environment, and (b) environmental information.

A non-transitory computer-readable medium storing instructions that, when executed, causes a computer to perform a method for displaying information of an environment is provided in an aspect of the disclosure. The method may comprise: displaying, on a terminal remote to a movable object, a first person view (FPV) of the environment based on augmented stereoscopic video data, wherein the augmented stereoscopic video data is generated by fusing: (a) stereoscopic video data generated by the movable object while operating in the environment, and (b) environmental information.

In some embodiments, analyzing stereoscopic video data may comprise stereo matching of image frames and/or depth map calculation. The stereo matching may comprise matching of feature points extracted from the image frames based on motion characteristics of the feature points. The depth map calculation may comprise filtering and applying a threshold to a depth map. The threshold may be applied to classify objects in the environment having a predetermined size and/or number of pixels in the depth map.

In some embodiments, the environmental information may comprise an environmental map, wherein the environmental map comprises a topological map or a metric map. The metric map may comprise at least one of the following: a point cloud, a 3D grid map, a 2D grid map, a 2.5D grid map, or an occupancy grid map. The environmental information may comprise (1) relative positions between a movable object and one or more objects in the environment, and/or (2) relative positions between two or more objects in the environment. The environmental information may comprise a distance of a movable object from an object in the environment, and/or an orientation of the movable object relative to the object. In some embodiments, the movable object may be configured follow or track the object. Alternatively, the object may be an obstacle lying in a motion path of the movable object, and the movable object may be configured to avoid the object.

In some embodiments, fusing the stereoscopic video data and the environmental information may comprise incorporating the environmental information into the stereoscopic video data. The augmented stereoscopic video data of the environment may comprise a graphical element associated with the environmental information. The graphical element may be overlay onto the FPV of the environment displayed on a terminal remote from the movable object. The graphical element may be configured to dynamically change as a position or an orientation of the movable object relative to the object in the environment changes.

In some embodiments, the movable object may be an unmanned aerial vehicle. In some embodiments, the terminal may comprise a head-mounted display (HMD). Alternatively, the terminal may comprise a pair of virtual reality (VR) or augmented reality (AR) enabled glasses. Optionally, the terminal may comprise a mobile device mounted onto a foldable headgear. The mobile device may have a graphical display configured to display the FPV. The terminal may allow a user to control and navigate the movable object from the first person view (FPV). In some embodiments, the movable object may be an unmanned aerial vehicle (UAV).

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The systems, methods, and devices disclosed herein can improve user experience during operation of movable objects such as unmanned aerial vehicles (UAVs). A display device as described herein may be configured to display an augmented first person view (FPV) of an environment based on augmented stereoscopic video data. The augmented stereoscopic video data may be generated by fusing stereoscopic video data and environmental information. The stereoscopic video data may be obtained using one or more imaging devices onboard a movable object. The environmental information may be obtained using an environmental sensing unit onboard the movable object.

The display device may include a wearable device. For example, the display device may be configured to be worn by a user. In some cases, the display device may be a pair of glasses, goggles, or a head-mounted display. The display device may include any type of wearable computer or device incorporating augmented reality (AR) or virtual reality (VR) technology. AR and VR involve computer-generated graphical interfaces that provide new ways for users to experience content. In augmented reality (AR), a computer-generated graphical interface may be superposed over real world video or images on a display device. In virtual reality (VR), a user may be immersed in a computer-generated environment rendered on a display device. The display device provided herein may be configured to display an augmented FPV of the real world environment from the movable object, in an AR setting or VR setting.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

Figure 1:
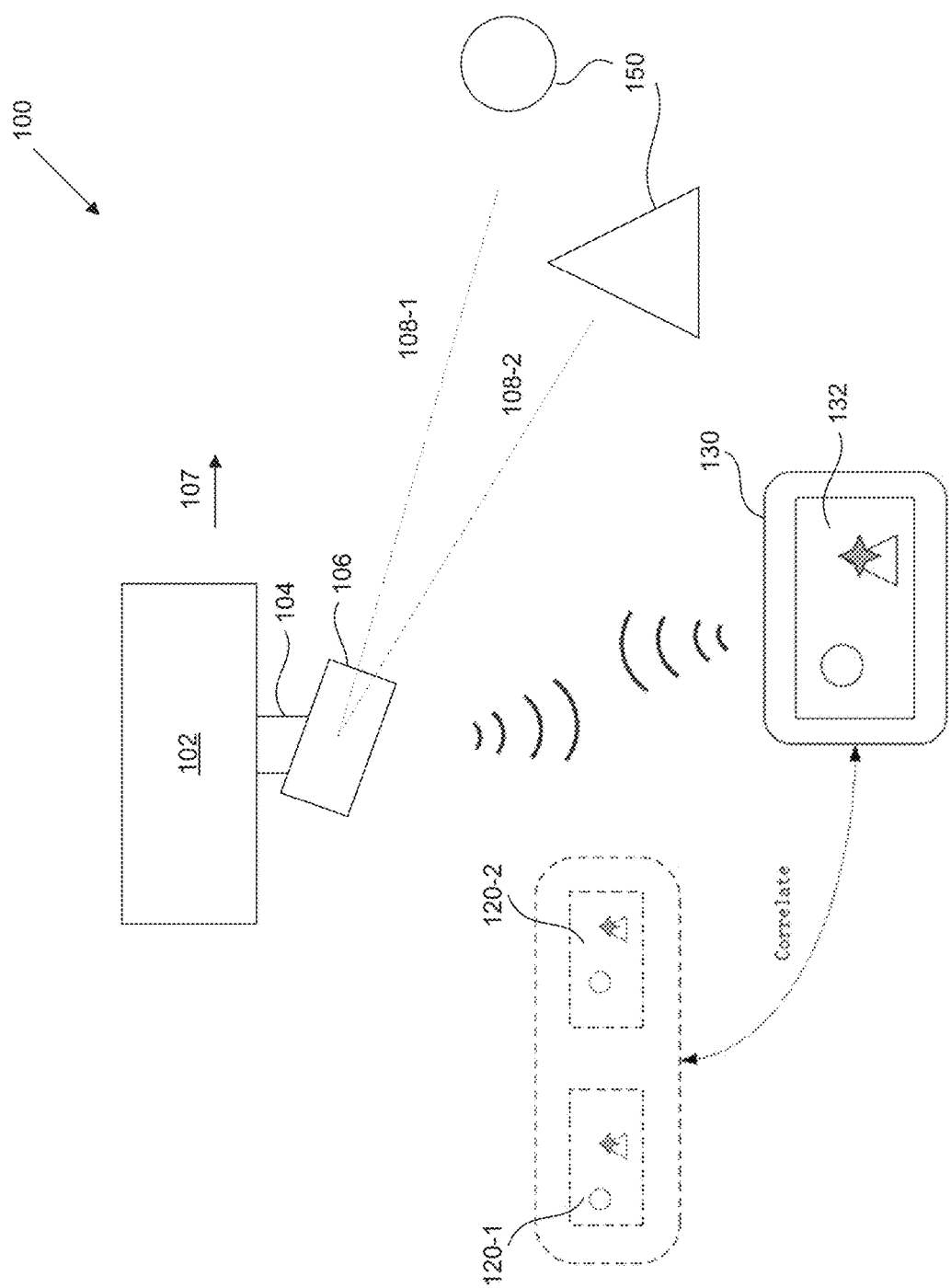
FIG. 1 shows a system for displaying a first person view (FPV) of an environment in accordance with some embodiments.

FIG. 1 shows a system for displaying a first person view (FPV) of an environment in accordance with some embodiments. A FPV visual navigation system 100 may comprise a movable object 102 and a user terminal 130 capable of communicating with the movable object. The user terminal may include a display device. In some embodiments, the display device may include a head-mounted display (HMD), or a pair of virtual reality (VR) or augmented reality (AR) enabled glasses. In some instances, the display device may comprise a mobile device mounted onto a foldable headgear. The mobile device may comprise a graphical display configured to display a FPV of the environment.

The display device may be configured to receive stereoscopic video data transmitted from the movable object, and display a FPV 132 of the environment based on the stereoscopic video data. The user terminal can be used to control one or more motion characteristics of the movable object and/or a payload supported by the movable object. For example, a user can use the user terminal to visually navigate and control operation (e.g., movement) of the movable object and/or one or more imaging devices onboard the movable object, based on the FPV of the environment. In some cases, the display device may be a pair of glasses or a head-mounted display worn on a user's head. In certain embodiments, the user's head movement of the display device and/or eye movement may effect a corresponding movement of the imaging devices and/or movable object.

The movable object may be any object capable of traversing the environment. The movable object may be capable of traversing air, water, land, and/or space. The environment may include objects that are incapable of motion (stationary objects) and objects that are capable of motion. Examples of stationary objects may include geographic features, plants, landmarks, buildings, monolithic structures, or any fixed structures. Examples of objects that are capable of motion include people, vehicles, animals, projectiles, etc.

In some cases, the environment may be an inertial reference frame. The inertial reference frame may be used to describe time and space homogeneously, isotropically, and in a time-independent manner. The inertial reference frame may be established relative to the movable object, and move in accordance with the movable object. Measurements in the inertial reference frame can be converted to measurements in another reference frame (e.g., a global reference frame) by a transformation (e.g., Galilean transformation in Newtonian physics).

The movable object may be a vehicle. The vehicle may be a self-propelled vehicle. The vehicle may traverse the environment with aid of one or more propulsion units. The vehicle may be an aerial vehicle, a land-based vehicle, a water-based vehicle, or a space-based vehicle. The vehicle may be an unmanned vehicle. The vehicle may be capable of traversing the environment without a human passenger onboard. Alternatively, the vehicle may carry a human passenger. In some embodiments, the movable object may be an unmanned aerial vehicle (UAV). Any description herein of a UAV or any other type of movable object may apply to any other type of movable object or various categories of movable objects in general, or vice versa. For instance, any description herein of a UAV may apply to any unmanned land-bound, water-based, or space-based vehicle. Further examples of movable objects are provided in greater detail elsewhere herein.

As mentioned above, the movable object may be capable of traversing an environment. The movable object may be capable of flight within three dimensions. The movable object may be capable of spatial translation along one, two, or three axes. The one, two or three axes may be orthogonal to one another. The axes may be along a pitch, yaw, and/or roll axis. The movable object may be capable of rotation about one, two, or three axes. The one, two, or three axes may be orthogonal to one another. The axes may be a pitch, yaw, and/or roll axis. The movable object may be capable of movement along up to 6 degrees of freedom. The movable object may include one or more propulsion units that may aid the movable object in movement. For instance, the movable object may be a UAV with one, two or more propulsion units. The propulsion units may be configured to generate lift for the UAV. The propulsion units may include rotors. The movable object may be a multi-rotor UAV.

The movable object may have any physical configuration. For instance, the movable object may have a central body with one or arms or branches extending from the central body. The arms may extend laterally or radially from the central body. The arms may be movable relative to the central body or may be stationary relative to the central body. The arms may support one or more propulsion units. For instance, each arm may support one, two or more propulsion units.

The movable object may have a housing. The housing may be formed from a single integral piece, two integral pieces, or multiple pieces. The housing may include a cavity within where one or more components are disposed. The components may be electrical components, such as a flight controller, one or more processors, one or more memory storage units, one or more sensors (e.g., one or more inertial sensors or any other type of sensor described elsewhere herein), one or more navigational units (e.g., a global positioning system (GPS) unit), one or communication units, or any other type of component. The housing may have a single cavity or multiple cavities. In some instances, a flight controller may in communication with one or more propulsion units and/or may control operation of the one or more propulsion units. The flight controller may communicate and/or control operation of the one or more propulsion units with aid of one or more electronic speed control (ESC) modules. The flight controller may communicate with the ESC modules to control operation of the propulsion units.

The movable object may be configured to support an onboard payload 106. The payload may have a fixed position relative to the movable object, or may be movable relative to the movable object. The payload may spatially translate relative to the movable object. For instance, the payload may move along one, two or three axes relative to the movable object. The payload may rotate relative to the movable object. For instance, the payload may rotate about one, two or three axes relative to the movable object. The axes may be orthogonal to on another. The axes may be a pitch, yaw, and/or roll axis. Alternatively, the payload may be fixed or integrated into the movable object.

The payload may be movable relative to the movable object with aid of a carrier 104. The carrier may include one or more gimbal stages that may permit movement of the carrier relative to the movable object. For instance, the carrier may include a first gimbal stage that may permit rotation of the carrier relative to the movable object about a first axis, a second gimbal stage that may permit rotation of the carrier relative to the movable object about a second axis, and/or a third gimbal stage that may permit rotation of the carrier relative to the movable object about a third axis. Any descriptions and/or characteristics of carriers as described elsewhere herein may apply.

The payload may include a device capable of sensing the environment about the movable object, a device capable of emitting a signal into the environment, and/or a device capable of interacting with the environment. One or more sensors may be provided as a payload, and may be capable of sensing the environment. The one or more sensors may include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In FIG. 1, the payload 106 may be an imaging device. In some embodiments, the imaging device may be a multi-ocular video camera. The multi-ocular video camera may be mounted in a forward-looking direction 107 of the movable object. Alternatively, the multi-ocular video camera may be mounted in any direction of the movable object (e.g., rear-looking, side-looking, top-looking, or bottom-looking). The multi-ocular video camera may be operably coupled to the movable object via the carrier 104. The carrier may comprise a multi-axis gimbal. The multi-ocular video camera may be rotatably coupled to the movable object via the multi-axis gimbal. In some cases, the multi-ocular video camera can be a binocular video camera or a stereo camera.

In the example of FIG. 1, the payload may be a binocular video camera comprising two or more lenses with a separate image sensor for each lens. A distance (intra-axial distance) between the lenses in the camera may be about an average distance (intra-ocular distance) between a person's eyes. The lenses may be disposed at different locations relative to each other, thereby resulting in different optical axes. For example, a first optical axis 108-1 may be associated with a first lens and a first image sensor. Likewise, a second optical axis 108-2 may be associated with a second lens and a second image sensor. The first image sensor may be configured to capture a first image 120-1 and the second image sensor may be configured to capture a second image 120-2. In some instances, the first and second images may respectively correspond to a left-eye image and a right-eye image. The left-eye image and the right-eye image may be stereo matched to form a binocular image (e.g., a 3-D image). The left-eye image and the right-eye image may comprise images of objects 150 in the environment. The positions of the objects in the captured images 120-1 and 120-2 may be slightly different due to binocular vision resulting from the different optical axes.

In some embodiments, an inertial measurement unit (IMU) (not shown) may be disposed on the payload, for example on the imaging device. Alternatively, the IMU may be disposed on the carrier that couples the payload to the movable object. The IMU can be configured to obtain real-time positional information of the imaging device. The real-time positional information from the IMU may be indicative of the actual position of the imaging device, since the IMU is mounted on the payload.

An imaging device as disclosed herein may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the imaging device may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

A payload may include one or more types of sensors. Some examples of types of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

Any examples herein of payloads may apply to devices that may be carried by the movable object or that may be part of the movable object. For instance, one or more sensors may be part of the movable object. The one or more sensors may or may not be provided in addition to the payload. This may apply for any type of payload, such as those described herein.

The movable object may be capable of communicating with the user terminal. The user terminal may communicate with the movable object itself, with a payload of the movable object, and/or with a carrier of the movable object, whereby the carrier is used to support the payload. Any description herein of communications with the movable object may also apply to communications with the payload of the movable object, the carrier of the movable object, and/or one or more individual components of the movable object (e.g., communication unit, navigation unit, propulsion units, power source, processors, memory storage units, and/or actuators).

The communications between the movable object and the user terminal may be wireless communications. Direct communications may be provided between the movable object and the user terminal. The direct communications may occur without requiring any intermediary device or network. Indirect communications may be provided between the movable object and the user terminal. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

The user terminal may be any type of external device. Examples of user terminals may include, but are not limited to, smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, head-mounted devices (HMD), headbands), pendants, armbands, leg bands, shoes, vests), gesture-recognition devices, microphones, any electronic device capable of providing or rendering image data, or any other type of device. The user terminal may be a handheld object. The user terminal may be portable. The user terminal may be carried by a human user. The user terminal may be worn by a human user. In some cases, the user terminal may be located remotely from a human user, and the user can control the user terminal using wireless and/or wired communications. Various examples, and/or characteristics of user terminal are provided in greater detail elsewhere herein.

A user terminal may include one or more processors that may be capable of executing non-transitory computer readable media that may provide instructions for one or more actions. The user terminal may include one or more memory storage devices comprising non-transitory computer readable media including code, logic, or instructions for performing the one or more actions. The user terminal may include software applications that allow the user terminal to communicate with and receive imaging data from a movable object. The user terminal may include a communication unit, which may permit the communications with the movable object. In some instances, the communication unit may include a single communication module, or multiple communication modules. In some instances, the user terminal may be capable of interacting with the movable object using a single communication link or multiple different types of communication links.

The user terminal may include a display (or display device). The display may be a screen. The display may be a light-emitting diode (LED) screen, OLED screen, liquid crystal display (LCD) screen, plasma screen, or any other type of screen. The display may or may not be a touchscreen. The display may be configured to show a graphical user interface (GUI). The GUI may show an image or a FPV that permit a user to control actions of the UAV. In some instances, the user may select a target from the image. The target may be a stationary target or a moving target. In other instances, the user may select a direction of travel from the image. The user may select a portion of the image (e.g., point, region, and/or object) to define the target and/or direction. The user may select the target and/or direction by changing the focus and/or direction of the user's gaze point on the screen (e.g., based on eye-tracking of the user's regions of interest). In some cases, the user may select the target and/or direction by moving his or her head in different directions and manners.

A user may touch a portion of the screen. The user may touch the portion of the screen by touching a point on the screen. Alternatively, the user may select a region on a screen from a pre-existing set of regions, or may draw a boundary for a region, a diameter of a region, or specify a portion of the screen in any other way. The user may select the target and/or direction by selecting the portion of the image with aid of a user interactive device (e.g., handheld controller, mouse, joystick, keyboard, trackball, touchpad, button, verbal commands, gesture-recognition, attitude sensor, thermal sensor, touch-capacitive sensors, or any other device). A touchscreen may be configured to detect location of the user's touch, length of touch, pressure of touch, and/or touch motion, whereby each of the aforementioned manner of touch may be indicative of a specific input command from the user.

The image on the display may show a view obtained with aid of a payload of the movable object. For instance, an image captured by the imaging device may be shown on the display. This may be considered a first person view (FPV). In some instances, a single imaging device may be provided and a single FPV may be provided. Alternatively, multiple imaging devices having different fields of view may be provided. The views may be toggled between the multiple FPVs, or the multiple FPVs may be shown simultaneously. The multiple FPVs may correspond to (or can be generated by) different imaging devices, which may have different field of views. A user may use the user terminal to select a portion of the image collected by the imaging device to specify a target and/or direction of motion by the movable object.

In another example, the image on the display may show a map that may be generated with aid of information from a payload of the movable object. The map may optionally be generated with aid of multiple imaging devices (e.g., right-eye camera, left-eye camera, or cameras at various orientations), which may utilize stereo-mapping techniques. In some instances, the map may be generated based on positional information about the movable object relative to the environment, the imaging device relative to the environment, and/or the movable object relative to the imaging device. Positional information may include posture information, spatial location information, angular velocity, linear velocity, angular acceleration, and/or linear acceleration. The map may be optionally generated with aid of one or more additional sensors, as described in greater detail elsewhere herein. The map may be a two-dimensional map or a three-dimensional map. The views may be toggled between a two-dimensional and a three-dimensional map view, or the two-dimensional and three-dimensional map views may be shown simultaneously. A user may use the user terminal to select a portion of the map to specify a target and/or direction of motion by the movable object. The views may be toggled between one or more FPV and one or more map view, or the one or more FPV and one or more map view may be shown simultaneously. The user may make a selection of a target or direction using any of the views. The portion selected by the user may include the target and/or direction. The user may select the portion using any of the selection techniques as described.

In some embodiments, the image data may be provided in a 3D virtual environment that is displayed on the user terminal (e.g., virtual reality system or augmented reality system). The 3D virtual environment may optionally correspond to a 3D map. The virtual environment may comprise a plurality of points or objects that can be manipulated by a user. The user can manipulate the points or objects through a variety of different actions in the virtual environment. Examples of those actions may include selecting one or more points or objects, drag-and-drop, translate, rotate, spin, push, pull, zoom-in, zoom-out, etc. Any type of movement action of the points or objects in a three-dimensional virtual space may be contemplated. A user may use the user terminal to manipulate the points or objects in the virtual environment to control a flight path of the UAV and/or motion characteristic(s) of the UAV. A user may also use the user terminal to manipulate the points or objects in the virtual environment to control motion characteristic(s) and/or different functions of the imaging device.

For example, in some embodiments, a user may use the user terminal to implement target-pointing flight. The user may select one or more points on an image displayed on the user terminal. The image may be provided in a GUI rendered on the output device of the user terminal. When the user selects the one or more points, the selection may extend to a target associated with that point. In some cases, the selection may extend to a portion of the target. The point may be located on or proximate to the target in the image. The UAV may then fly towards and/or track the target. For example, the UAV may fly to a predetermined distance, position, and/or orientation relative to the target. In some instances, the UAV may track the target by following it at the predetermined distance, position, and/or orientation. The UAV may continue to move towards the target, track the target, or hover at the predetermined distance, position, and/or orientation to the target, until a new target instruction is received at the user terminal. A new target instruction may be received when the user selects another different one or more points on the image. When the user selects the different one or more points, the target selection may switch from the original target to a new target that is associated with the new one or more points. The UAV may then change its flight path and fly towards and/or track the new target.

In some other embodiments, a user may use the user terminal to implement direction-pointing flight. A user may select a point on an image displayed on the user terminal. The image may be provided in a GUI rendered on the output device of the user terminal. When the user selects the point, the selection may extend to a target direction associated with that point. The UAV may then fly in the direction. The UAV may continue to move in the direction until a countermanding condition is detected. For instance, the UAV may fly in the target direction until a new target direction instruction is received at the user terminal. A new target direction instruction may be received when the user selects another different point on the image. When the user selects a different point, the target direction selection may switch from the original direction to a new target direction that is associated with the new point. The UAV may then change its flight path and fly in the new target direction.

The user terminal may be used to control the movement of the movable object, such as the flight of an UAV. The user terminal may permit a user to manually directly control flight of the movable object. Alternatively, a separate device may be provided that may allow a user to manually directly control flight of the movable object. The separate device may or may not be in communication with the user terminal. The flight of the movable object may optionally be fully autonomous or semi-autonomous. The user terminal may optionally be used to control any component of the movable object (e.g., operation of the payload, operation of the carrier, one or more sensors, communications, navigation, landing stand, actuation of one or more components, power supply control, or any other function). Alternatively, a separate device may be used to control one or more components of the movable object. The separate device may or may not be in communication with the user terminal. One or more components may be controlled automatically with aid of one or more processors.

In some instances, a direction of travel of the movable object may be selected by the user. The movable object may travel in the direction selected by the user. The direction may be selected by a user selecting a portion of an image (e.g., in FPV or map view). The movable object may travel in the selected direction until a countermanding instruction is received or when a countermanding condition is realized. For instance, the movable object may automatically travel in the selected direction until a new direction is input, or a new target is input. The movable object may travel in the selected direction until a different flight mode is selected. For instance, the user may take manual control over the flight of the movable object.

Figure 2:
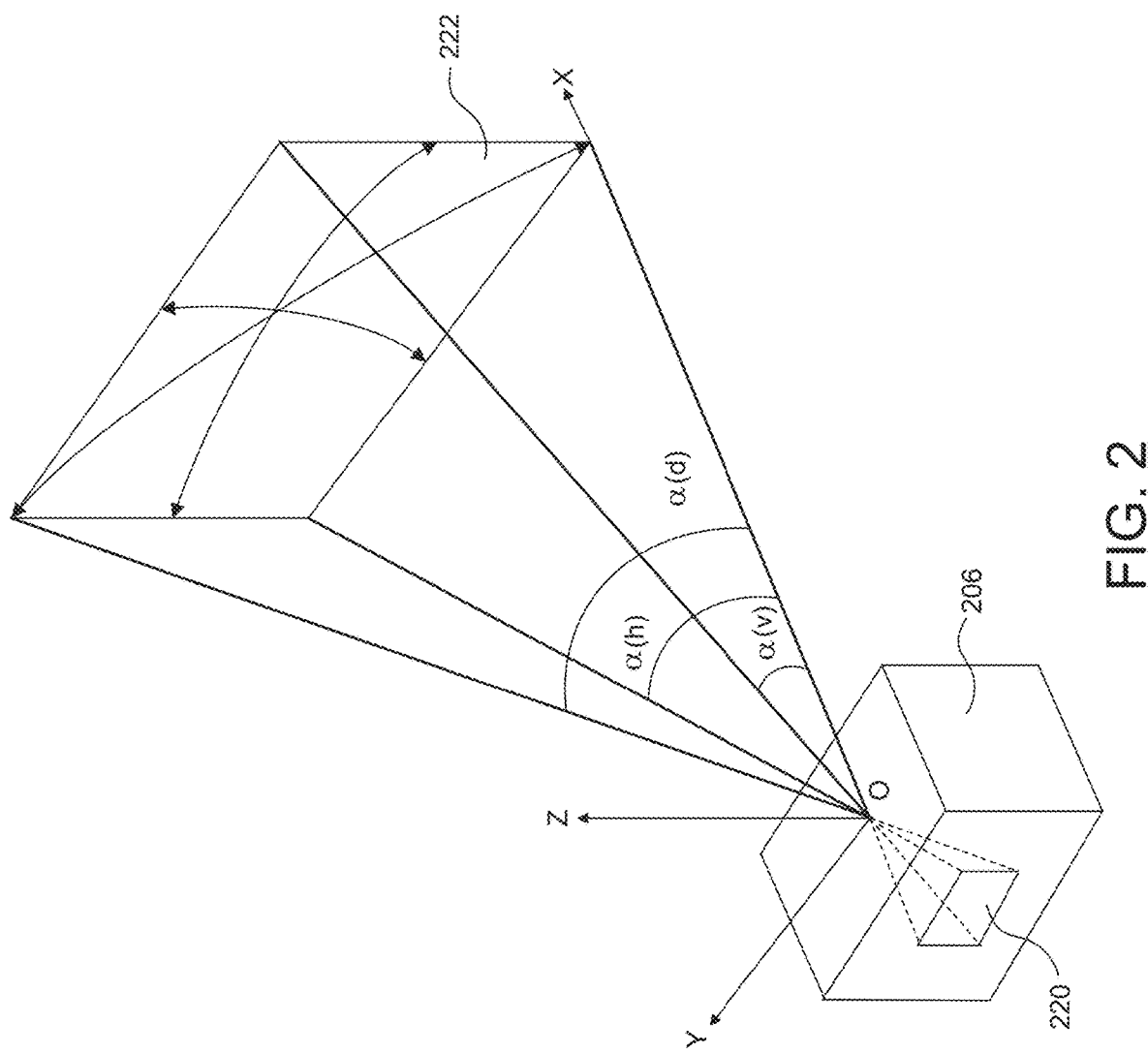
FIG. 2 illustrates different angles of view of an imaging device in accordance with some embodiments.

FIG. 2 illustrates different angles of view of an imaging device in accordance with some embodiments. The imaging device can be used to collect raw image data. In some cases, the raw image data can be used to generate stereoscopic video data which is transmitted from a movable object to a display device. The display device may be configured to display a FPV of the environment based on the stereoscopic video data.

An image frame 220 (or image plane) may be projected on an imaging device 206. The imaging device may be coupled to a movable object, for example as shown in FIG. 1. The size of the image frame may be determined by a size of the image sensors on the imaging device. The image frame may be located at a focal length distance from a point O corresponding to a center of the lens of the imaging device. An angle of view (also known as field of view) may define the angular extent of a scene 222 that can be captured by the imaging device. In other words, an image of the scene 222 may be configured to fit approximately within the dimensions of the image frame 220. The angle of view may be measured horizontally (e.g., from the left edge to the right edge), vertically (e.g., from the top edge to the bottom edge), or diagonally (e.g., from one corner to an opposite corner). As shown in FIG. 2, the imaging device may have a horizontal angle of view characterized by an angle $\alpha(h)$ in the X-Y plane, a vertical angle of view characterized by an angle $\alpha(v)$ in the X-Z plane, and a diagonal angle of view characterized by an angle $\alpha(d)$ in an oblique plane.

For lenses projecting rectilinear (non-spatially-distorted) images of distant objects, the angle of view can be defined by the effective focal length and the image format dimensions. In some cases, non-rectilinear images may be produced, for example using lens with distortion such as a wide-angle lens or a fisheye lens. For example, when the imaging device on the movable object uses a wide-angle lens having a wider angle of view than a normal lens, perspective distortion can occur in the FPV images or video. Perspective distortion is a warping or transformation of an object and its surrounding area. Perspective distortion can cause an imaged object to differ significantly from what the object would look like with a normal focal length, due to the relative scale of nearby and distant features. Perspective distortion in wide-angle lens is known as extension or wide-angle distortion, and this phenomenon can be observed in images that are shot from close using wide-angle lens. In particular, objects close to the lens may appear abnormally large relative to more distant objects, whereas distant objects may appear abnormally small and hence more distant (i.e., distances between objects are extended in the resulting image).

Figure 3A:
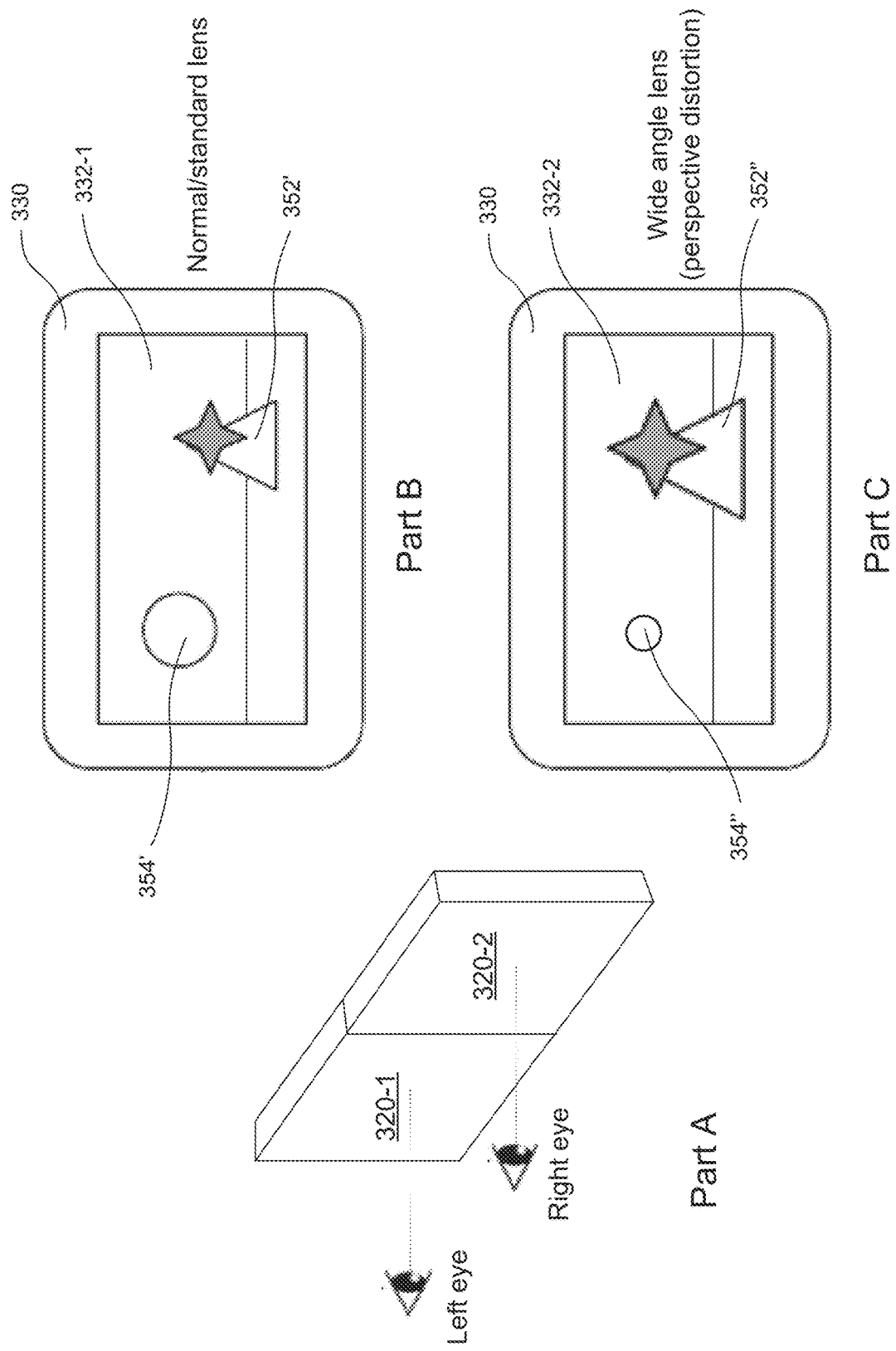
FIG. 3A illustrates an example of extension distortion that can affect a user's perception of distances between objects in a physical environment, in accordance with some embodiments.

Extension distortion can affect a user's perception of distances between objects in a physical environment, as shown in FIG. 3A. Referring to part A of FIG. 3A, a user terminal may comprise a display device. The display device may include a display area 320 configured to display image data. In some embodiments, the display area may be configured to display a plurality of FPV stereoscopic images or video captured by an imaging device on a movable object. To display a 3-dimensional FPV of the environment through stereo matching, the display area 320 may be partitioned into a left eye display 320-1 for displaying left eye images and a right eye display 320-2 for displaying right eye images. When a user is wearing the display device (e.g., a head-mounted display or AR/VR glasses), the user's left eye may see a left eye image displayed in 320-1, and the user's right eye may see a right eye image displayed in 320-2. The left and right eye images may be visually combined (stereo matched) to generate a 3-dimensional FPV of the environment.

Referring to part B of FIG. 3A, a 3-dimensional FPV 332-1 of the environment may be captured using a normal (or standard) lens. A normal lens is a lens that reproduces a field of view that appears "natural" to a human observer. A normal lens may have an angle of view that covers between 62° and 40°. The physical environment may include a first object 352 and a second object 354 located within the environment. The FPV 332-1 may depict an image 352' of the first object and an image 354' of the second object. The first object may be closer to the normal lens (or imaging device) than the second object. Since the image is captured using a normal lens, a distance between the first and second objects within the FPV 332-1 may be in proportion to an actual distance between the first and second objects in the physical environment. Accordingly, there is no perspective distortion in the FPV 332-1.

An example of perspective distortion (specifically extension distortion) is shown in part C of FIG. 3A. Referring to part C, a 3-dimensional FPV 332-2 of the same environment in part B may be captured using a wide-angle lens. A wide-angle lens has a focal length that is substantially less than the focal length of a normal lens for a given image plane. A wide-angle lens allows a greater proportion of a scene to be included in a photograph or video. In some cases, wide-angle lenses may be used in imaging devices on movable objects (such as UAVs) to exaggerate relative size, so as to render foreground objects more prominent and striking, while capturing more expansive backgrounds. As shown in part C, the FPV 332-2 may depict an image 352" of the first object and an image 354" of the second object that are located in the physical environment. The first object may be closer to the wide-angle lens than the second object. Since the FPV image 332-2 is captured using the wide-angle lens, the first object which is nearby appears larger, whereas the second object appears smaller and further away than it actually is in the environment. In other words, the wide-angle lens appears to extend the distance between the first and second objects.

In some instances, when a wide angle lens is used, greater apparent perspective distortion may be exhibited when the imaging device is not aligned perpendicularly to a subject (which can be a person or an object). Parallel lines converge at the same rate as with a normal lens, but converge more due to the wider total field. For example, a building may appear to be falling backwards much more severely when an imaging device with a wide-angle lens is pointed upward from ground level than it would have been if photographed with a normal lens at the same distance from the subject, because more of the building is visible in the wide-angle shot. This increase in perspective distortion can affect a user's perception of distances, and the user's control of a movable object (e.g., a UAV) through the FPV.

As shown in part C, extension distortion can affect a user's perception of distances between objects in a real environment. In some cases, the extension distortion may be further exacerbated by differences in the angle of view of an image (as captured through a lens) and the angle of view at which the image is viewed. For example, a head-mounted display that is configured to display the stereoscopic FPV image may have a narrower angle of view than the wide angle lens of the imaging device. This is because the display area 320 of a head-mounted display is usually located close to the user's eyes, in contrast to ordinary viewing distances (such as an arms-length distance). As a result, a user may observe apparent distortion in relative distances in the FPV 332-2 when the image is captured using a wide angle lens and rendered on a head-mounted display.

Due to the distortion in relative distances, a user who is operating a movable object (e.g., a UAV) through the FPV 332-2 on a head-mounted display may not be able to accurately gauge the distances between objects, as well as the actual sizes of the objects in the environment. In an environment filled with obstacles, a user may find it difficult and challenging to maneuver the UAV through the environment while avoiding those obstacles. In some cases, the UAV may be capable of flying at high speeds (e.g., up to 30 m/s), which may not allow a user sufficient reaction time to respond to oncoming obstacles. For example, an object that appears far away may quickly seem near when the UAV is flying at high speed towards the object. A user who is inexperienced may either under-react or over-react to the apparent change in size/distance of objects. The extension distortion in FPV images/video may compromise flight safety during UAV operation, and may result in a user inadvertently crashing the UAV or causing the UAV to collide with obstacles.

Accordingly, there is a need for FPV flight control and guidance systems that can provide accurate distance and other environmental information to a user, and that allow the user to safely operate an aerial vehicle from a 3-dimensional FPV rendered on a display device (e.g., a head-mounted display). The following embodiments of the present disclosure can address the above need, by providing augmented stereoscopic video data of an environment on a display device to a user. The augmented stereoscopic video data can be generated by fusing stereoscopic video data and environmental information. The environmental information can be provided in an augmented reality (AR) layer that is superposed over 3-dimensional FPV images or video obtained from the stereoscopic video data. The environmental information may contain actual distances of a movable object (e.g., a UAV) from objects in a physical environment, as well as distances between various objects in the environment. The objects in the environment may be stationary, in motion, or capable of motion. The environmental information may also contain information about obstacles or potential obstacles in a motion path of the movable object. By providing the environmental information in an AR layer that is overlay over the 3-dimensional FPV, the operational risks due to extension distortion effects can be minimized. For example, a user can rely on augmented environmental information (that is dynamically updated in real-time) to safely maneuver an aerial vehicle through various environments.

Figure 3B:
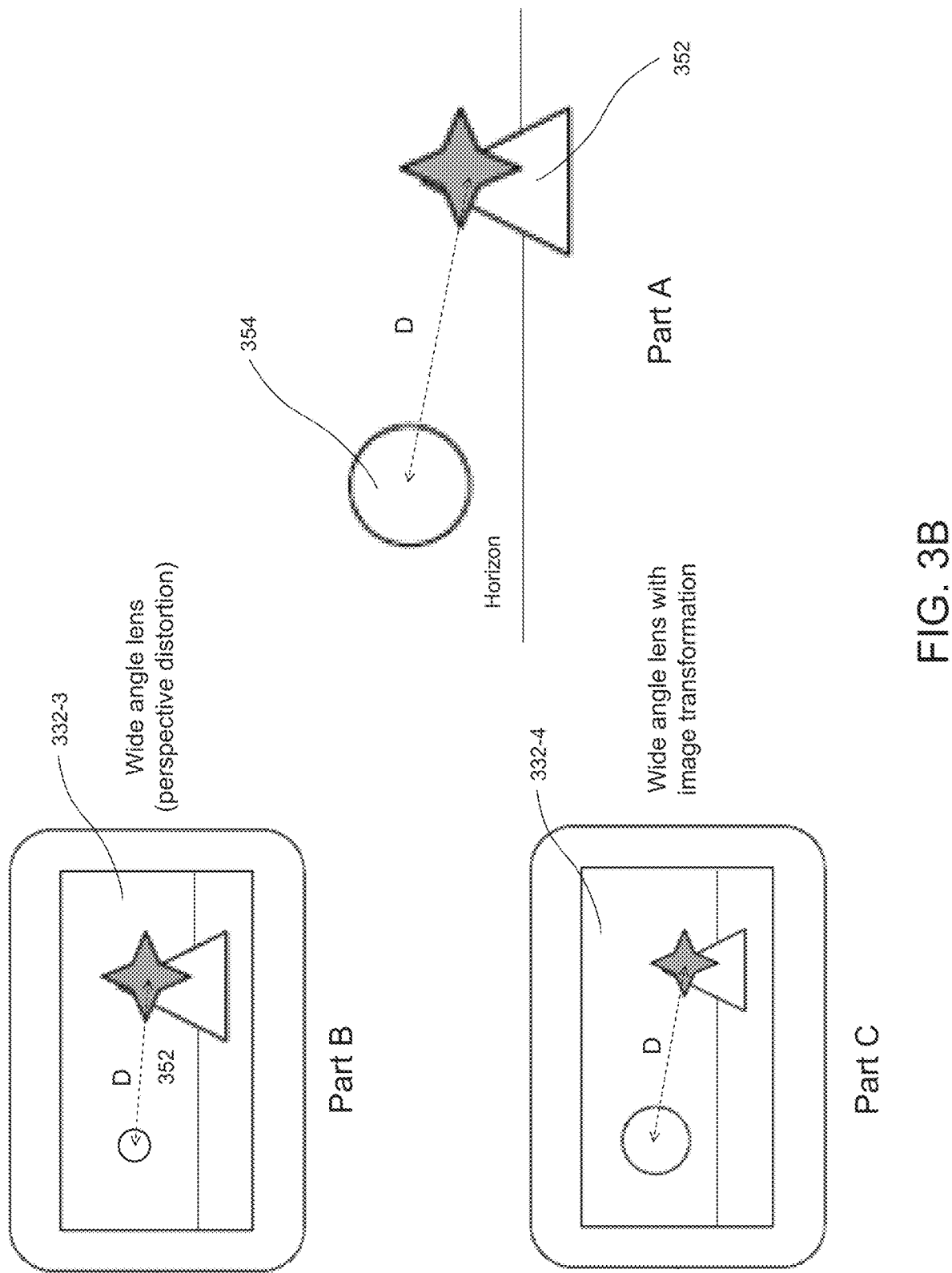
FIG. 3B illustrates matching of environmental information in an augmented reality (AR) layer to a distorted 3-D FPV and correction of the distorted 3-D FPV based on environmental information, in accordance with some embodiments.

FIG. 3B illustrates the matching of environmental information in an AR layer to a distorted 3-D FPV and correction of the 3-D FPV based on environmental information, in accordance with some embodiments. Referring to part A of FIG. 3B, the first object 352 and the second object 354 may be located within the physical environment, and spaced apart by a distance D. Part B of FIG. 3B shows a 3-D FPV 332-3 of the environment captured using a wide-angle lens, that is subject to extension distortion. As previously mentioned, extension distortion can affect a user's judgment of the distances between objects in an environment.

According to various embodiments of the disclosure, an augmented reality (AR) layer may be superposed over the 3-D FPV to provide real-time environmental information to a user, and that allows the user to know the true distances between objects in the environment. For example, as shown in part B of FIG. 3B, the 3-D FPV 332-3 of the environment may include an AR layer comprising one or more graphical elements that are matched to the (extension distorted) images of the objects 352/354. For example, the graphical elements may include a virtual line 352 extending between the distorted images of the first and second objects. The graphical elements may also include a graphical element D showing the actual distance between the first and second objects. By providing accurate and real-time environmental information to a user through the AR layer, the effect of extension distortion on a user's perception of object distances can be reduced. This is because the environmental information includes accurate distances between objects in the environment, which a user can rely upon to safely navigate the movable object through the environment.

As shown in part B of FIG. 3B, the images of the objects in the 3-D FPV are subject to extension distortion. Accordingly, the graphical elements in the AR layer have to be matched to the distorted images, such that the graphical elements can be accurately superposed over the corresponding images ("correct" set of images) in the 3-D FPV. The graphical elements may be indicative of various information contained in a map (e.g., a 3-D map) of the environment. In some embodiments, the 3-D map of the environment can be matched to the (distorted) 3-D FPV using object recognition techniques, such as feature point recognition. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image).

Feature points can be detected using various algorithms (e.g., texture detection algorithm) which may extract one or more feature points from the 3-D FPV and from the 3-D environmental map. The algorithms may additionally make various calculations regarding the feature points. For example, the algorithms may calculate a total number of feature points, or "feature point number." The algorithms may also calculate a distribution of feature points. For example, the feature points may be widely distributed within an image (e.g., image data) or a subsection of the image. For example, the feature points may be narrowly distributed within an image (e.g., image data) or a subsection of the image. The algorithms may also calculate a quality of the feature points. In some instances, the quality of feature points may be determined or evaluated based on a value calculated by algorithms mentioned herein (e.g., FAST, Corner detector, Harris, etc).

In some embodiments, an image transformation may be applied to the 3-D FPV to correct for extension distortion, and to modify the 3-D FPV such that it matches the environmental information. For example, part C of FIG. 3B shows a modified 3-D FPV in which the extension distortion effect has been reduced (or corrected for), based on actual distance information obtained from a 3-D map of the environment. The image transformation may include using a transformation matrix to map images in the 3-D FPV to the 3-D environmental map. The transformation matrix may include one or more scaling factors that account for (1) the extended distances between images of objects in the 3-D FPV and/or (2) size distortion of the images of objects in the 3-D FPV. Accordingly, the effect of extension distortion in the 3-D FPV can be reduced.

Next, the collection of environmental information and the generation of an augmented reality (AR) layer containing the environmental information will be described with reference to the following figures.

Figure 4:
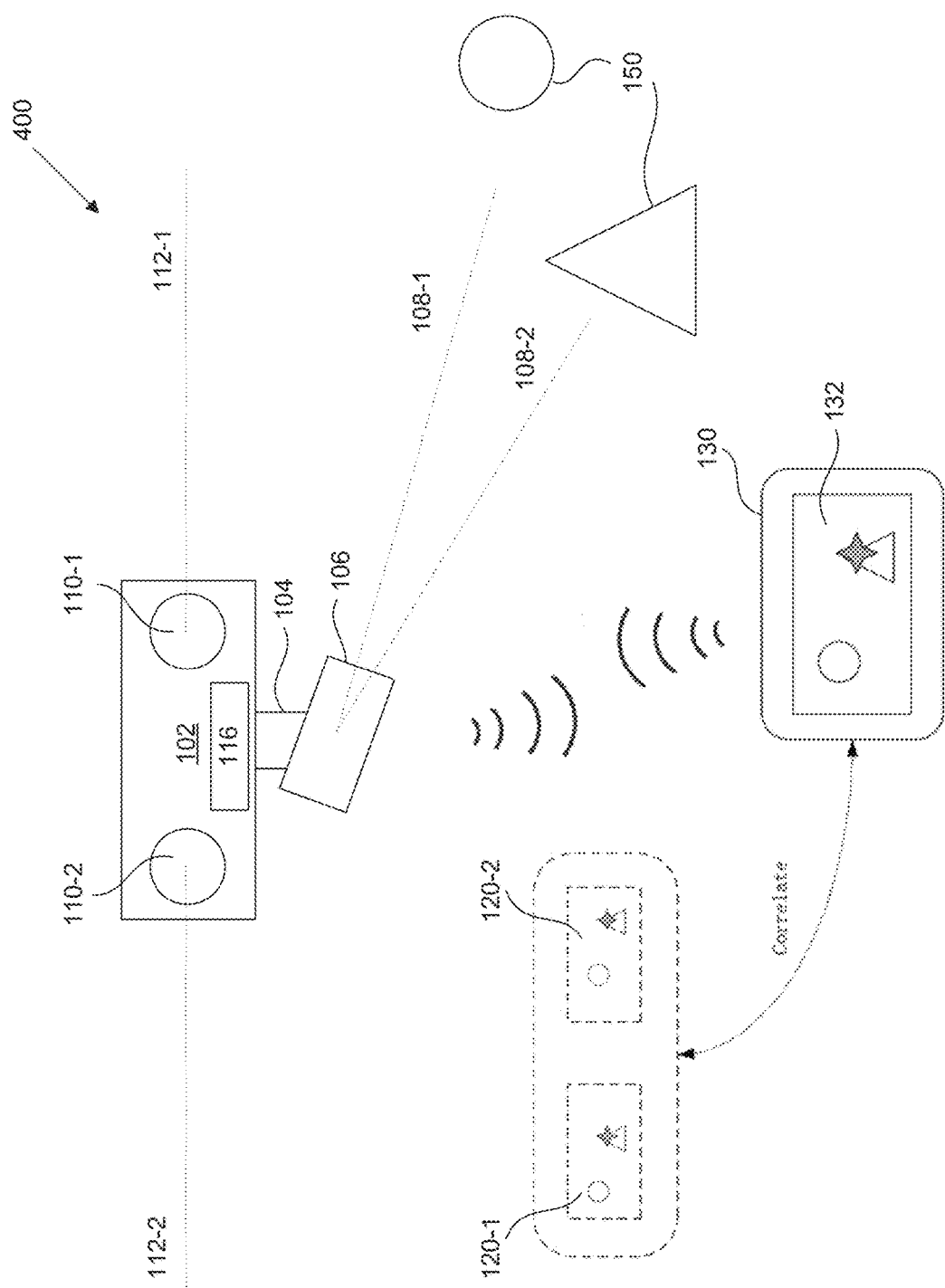
FIG. 4 shows a system for displaying a first person view (FPV) augmented with environmental information, in accordance with some embodiments.

FIG. 4 shows a system 400 for displaying a first person view (FPV) augmented with environmental information, in accordance with some embodiments. FIG. 4 may be similar to FIG. 1 except for the following differences. In FIG. 4, the movable object 102 may further comprise an environmental sensing unit 116 configured to obtain various information about an environment in which the movable object operates.

The environmental sensing unit may include any sensor that can be used to collect environmental information, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). In some embodiments, the environmental sensing unit may further include the imaging device 106 (payload). Optionally, the environmental sensing unit may receive imaging data collected by the imaging device 106, and process the imaging data to obtain environmental information. For example, the environmental sensing unit can be configured to construct a 3-D depth map of the environment using the imaging data, as described elsewhere herein. In some embodiments, the environmental sensing unit can comprise a GPS sensor, and the environment type can be determined based on a number of GPS satellites in communication with the GPS sensor. Similarly, the environmental sensing unit can comprise one or more lidar sensors, and the environment type can be determined based on time-of-flight data obtained by the lidar sensors. Likewise, the environmental sensing unit can comprise one or more vision sensors, and the environment type can be determined based on image data obtained by the vision sensors, such as an exposure time associated with the image data obtained by the vision sensors. Any number and combination of sensors can be used to obtain environmental information, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any combination of active sensors (e.g., sensors that generate and measure energy from their own source) and passive sensors (e.g., sensors that detect available energy).

The sensor data may provide various types of environmental information. For example, the sensor data may be indicative of an environment type, such as an indoor environment, outdoor environment, low altitude environment, high altitude environment, etc. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as structures or obstacles. Alternatively, a sensor can be used to provide data regarding the environment surrounding the UAV, such as weather conditions, proximity to potential obstacles, location of geographical features, location of manmade structures, a wind speed, a wind direction, a rain speed, a temperature, and the like.

In some embodiments, one or more of the sensors in the environmental sensing unit may be configured to provide data regarding a state of the movable object. The state information provided by a sensor can include information regarding a spatial disposition of the movable object (e.g., position information such as longitude, latitude, and/or altitude; orientation information such as roll, pitch, and/or yaw). The state information can also include information regarding motion of the movable object (e.g., translational velocity, translation acceleration, angular velocity, angular acceleration, etc.). A sensor can be configured, for instance, to determine a spatial disposition and/or motion of the movable object with respect to up to six degrees of freedom (e.g., three degrees of freedom in position and/or translation, three degrees of freedom in orientation and/or rotation). The state information may be provided relative to a global reference frame or relative to the reference frame of another entity. For example, a sensor can be configured to determine the distance between the movable object and the user, and/or the starting point of flight for the movable object.

In some embodiments, the sensing data obtained by the one or more sensors in the environmental sensing unit may be provided to a flight controller. The flight controller may be configured to control, via one or more electronic speed control (ESC) units, one or more propulsion units of the movable object to effect motion of the movable object.

In some embodiments, the environmental sensing unit may include multiple imaging devices, or an imaging device with multiple lenses and/or image sensors. The imaging device(s) may be capable of taking multiple images substantially simultaneously, sequentially, or at different points in time. The multiple images may aid in the creation of a 3D scene, a 3D virtual environment, a 3D map, or a 3D model. For instance, a right-eye image and a left-eye image may be taken and used for stereo-mapping. A depth map may be calculated from a calibrated binocular image, as described in detail below. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

In some embodiments, stereoscopic video data obtained from one or more imaging devices may be analyzed to determine the environmental information. The environmental information may comprise an environmental map. The environmental map may comprise a topological map or a metric map. The metric map may comprise at least one of the following: a point cloud, a 3D grid map, a 2D grid map, a 2.5D grid map, or an occupancy grid map. The occupancy grid may be used to define a 3D map of the spatial environment surrounding the movable object.

In some embodiments, analysis of stereoscopic video data may comprise at least one of the following: (1) imaging device calibration, (2) stereo matching of image frames, and (3) depth map calculation. The imaging device calibration may comprise calibrating intrinsic parameters and extrinsic parameters of an imaging device such as a binocular camera. The binocular camera may be configured to capture one or more binocular images. The stereoscopic video data may be obtained from a plurality of binocular images. The stereo matching may comprise (1) extracting substantially in or near real-time feature points of each monocular image in each binocular image, (2) calculating the motion characteristics of the feature points, (3) matching corresponding feature points extracted from the image frames based on the motion characteristics of the feature points, and (4) eliminating mismatch feature points. The depth map calculation may comprise (1) calculating a pixel-based disparity map based on the matched feature points and (2) calculating a depth map based on the extrinsic parameters of the binocular camera. The depth map calculation may comprise filtering and applying a threshold to the depth map to determine or more obstacles. For example, the threshold may be applied to classify objects in the environment having a predetermined size and/or number of pixels in the depth map.

In the example of FIG. 4, one or more imaging devices 110 may be located on or within a body of the movable object. The imaging device 110 may be a binocular vision sensor. The imaging device 110 may be part of the environmental sensing unit 116. A binocular image captured by the imaging device 110 may be used to generate depth map information of the environment. The binocular image may be correlated/calibrated with an image obtained by another imaging device (e.g., imaging device 106). As shown in FIG. 4, a first vision sensor 110-1 and a second vision sensor 110-2 may be disposed at different locations relative to each other such that the first vision sensor and the second vision sensor have different optical axes. For example, the first vision sensor may have a first optical axis 112-1, and the second vision sensor may have a second optical 112-2. The optical axes 112-1 and 112-2 may extend in different directions. For example, the first optical axis may extend from a front portion of the movable object, and the second optical may extend from a rear portion of the movable object.

A depth map may be generated using the binocular image, by stereo matching of a left-eye image and a right-eye image. The left-eye image and right-eye image may be matched to obtain a depth image in which the position of obstacles/objects in the environment can be detected. In some embodiments, a depth map may be generated using multiple imaging devices 110 disposed at a plurality of locations on the movable object. The stereo matching may be performed using real-time block matching (BM) or semi-global block matching (SGBM) algorithms implemented using one or more processors. In some embodiments, ultrasonic data from an ultrasonic sensor may be additionally used to detect the position/distance of an object having no obvious texture (e.g., a binocular vision sensor may not be capable of detecting the position of a white-colored wall, or a glass wall).

A 3D map of the external environment may be generated by correlating the binocular image or any image to the depth map. For example, the left-eye image and/or the right-eye image may be mapped to the depth map. In some cases, the image captured by another imaging device 106 (payload) may be mapped to the depth map. The depth map may comprise a plurality of pixel points. A valid pixel point may correspond to an obstacle in the external environment. The relationship between pixel points and obstacles may be one-to-many or many-to-one. For example, a valid pixel point may correspond to a plurality of obstacles. Alternatively, a plurality of valid pixel points may correspond to an obstacle. In some cases, a group of valid pixel points may correspond to a group of obstacles. A valid pixel point has a value that is greater than 0. Conversely, an invalid pixel point is a point that is unidentifiable from the mapped image. An invalid pixel point has a value that is equal to or less than 0. Objects that have no obvious texture or are transparent may show up invalid pixel points in the image. In some embodiments, ultrasonic data from ultrasonic imaging may be used to supplement the visual correlation to identify those invalid pixel points. The ultrasonic imaging may be performed, for example using a lidar sensor located on the movable object. Ultrasonic data from the ultrasonic sensor can be used to detect the position/distance of an object having no obvious texture or that is transparent.

Next, 3D spatial points corresponding to the pixel points in the depth map may be generated. A 3D spatial point corresponding to a pixel point in the depth map may be given by:

$$\begin{pmatrix} X \\ Y \\ Z \end{pmatrix} = \begin{pmatrix} d(x-c_x)/f \\ d(y-c_y)/f \\ d \end{pmatrix}, \text{ if } d > 0.$$

where d is a depth in the depth map, f is a focal length of the imaging device, $(c_x, c_y)$ is an offset from a central point (centroid) of the movable object, and (x, y) is the pixel point on the depth map. A plurality of 3D spatial points may be distributed into a plurality of cells of an occupancy grid. The position of the movable object may be located at the center of the occupancy grid. In some cases, the position of the movable object may be located another portion (e.g., edge) of the occupancy grid. The occupancy grid may be used to define a 3D map of the spatial environment surrounding the movable object.

The occupancy grid may have plurality of cells. The occupancy grid may have a size of $n_x \times n_y \times n_z$, where $n_x$ is the number of cells along an x-axis, $n_y$ is the number of cells along a y-axis, and $n_z$ is the number of cells along a z-axis. $n_x$, $n_y$, and $n_z$ may be any integer, and may be the same or different. In some embodiments, $n_x=n_y=80$ and $n_z=40$. In some embodiments, $n_x$ and $n_y$ may be less than 80 or greater than 80. In some embodiments, $n_z$ may be less than 40 or greater than 40. Each cell in the occupancy grid may have a size of m×m×m, where m may be any dimension. In some embodiments, m may be less than or equal to 0.1 meters, 0.2 meters, 0.3 meters, 0.4 meters, 0.5 meters, or 1 meter. In some embodiments, m may be greater than 1 meter, 1.1 meter, 1.2 meter, 1.3 meter, 1.4 meter, 1.5 meter, or 2 meters.

The occupancy grid may have i number of cells, where $i=n_x \times n_y \times n_z$. Each cell may be denoted as an i-th cell. For example, $l=1$ may denote a first cell, and $l=10$ may denote a tenth cell. For each i-th cell, the number of 3D spatial points falling into the cell may be determined. A 3D map of the environment may be generated by determining, for each i-th cell, whether a number of 3D spatial points falling within the i-th cell is greater than a predetermined threshold value $\tau$. Each i-th cell may have a binary state $C_i$. When the number of 3D spatial points falling within the i-th cell is greater than the predetermined threshold value $\tau$, then $C_i=1$. When the number of 3D spatial points falling within the i-th cell is equal to or less than the predetermined threshold value $\tau$, then $C_i=0$. The predetermined threshold value $\tau$ may be determined based on a sampling frequency of the captured images, and an accuracy of the 3D spatial point as obtained from the depth map. The predetermined threshold value $\tau$ may increase when the sampling frequency increases and when the number of 3D spatial points falling within the cell increases. The predetermined threshold value $\tau$ may decrease when the accuracy of the 3D spatial point increases. The predetermined threshold value $\tau$ may have a range of values. For example, the predetermined threshold value may range from about 5 to about 30. In some cases, the predetermined threshold value may range from less than 5 to more than 30.

As previously mentioned, ultrasonic data may be used to supplement the visual correlation to identify invalid pixel points. When a valid ultrasonic reading $d_s$ is detected, the state $C_i$ of all cells having a distance of $d_s$ within the sonar range may be set to 1.

Figure 5:
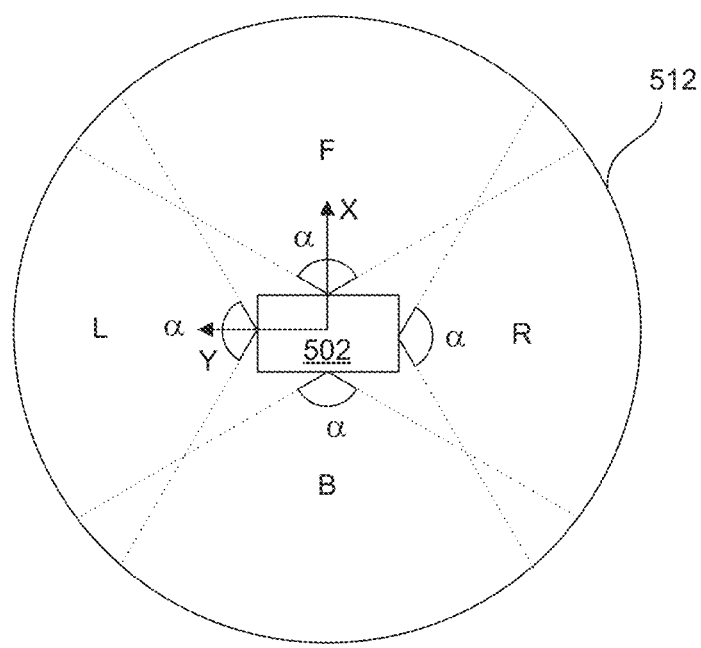
FIG. 5 illustrates an environmental sensing range of a movable object in accordance with some embodiments.
Figure 5:
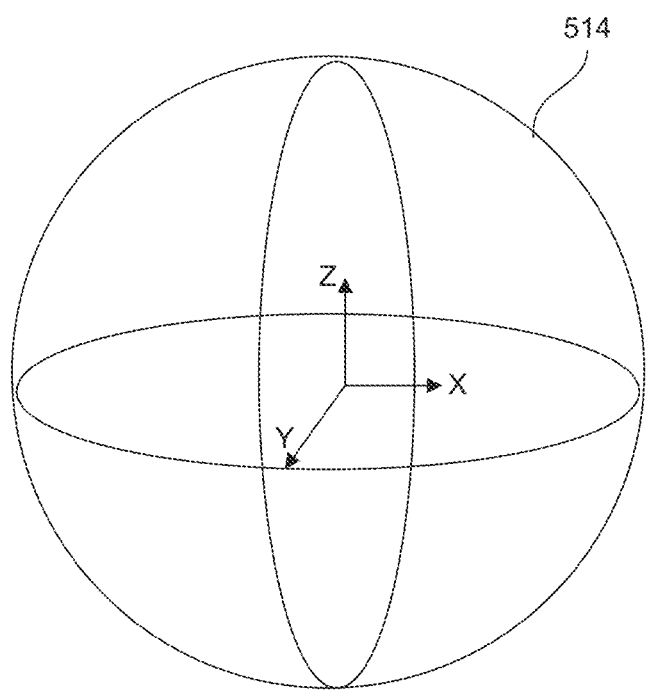

FIG. 5 illustrates an environmental sensing range of a movable object in accordance with some embodiments. Part A of FIG. 5 shows the environmental sensing range of a movable object 502 from an aerial view as viewed from above the movable object. Part B of FIG. 5 shows the environmental sensing range of the movable object in 3-dimensional space. The movable object in FIG. 5 may be, for example a UAV configured to operate in an environment.

In FIG. 5, an environmental sensing unit may comprise a plurality of imaging devices coupled to different sides of the movable object. For example, the plurality of imaging devices may be coupled to at least a front side (F), rear side (B), left side (L), right side (R), top side, or a bottom side of the movable object. Each imaging device may have an angle of view $\alpha$. The maximum environmental sensing range may be determined based on the angle of view $\alpha$ (horizontally, vertically, and diagonally) and image sensor size within each imaging device. In FIG. 5, a shape of the environmental sensing range is shown as a circle 512 (planar view in part A) or a sphere 514 (3-dimensional view in part B). It should be noted that the environmental sensing range can be defined by any shape and/or size. For example, in some embodiments, the environmental sensing range can have defined by a regular shape (e.g., cube, cylinder, cone, etc.) or an irregular shape surrounding the movable object.

In some cases, the field of view of adjacent imaging devices may overlap with one another, for example as shown in part A of FIG. 5. The overlap in the field of view ensures that sufficient image data points of the environment can be collected, from which an environmental map can be constructed with a certain level of accuracy. In some alternative cases, the field of view of adjacent imaging devices need not overlap with one another.

The plurality of imaging devices may be configured to capture binocular or multi-ocular images of the environment surrounding the movable object. One or more of the imaging devices may capture images at a same time instance or at different time instances. A 3-D depth map of the environment can be obtained from the binocular or multi-ocular images. The plurality of imaging devices may provide a field of view of n degrees. In some embodiments, n may be about 90°, 100°, 110°, 120°, 130°, 140°, 150°, 160°, 170°, 180°, 190°, 200°, 210°, 220°, 230°, 240°, 250°, 260°, 270°, 280°, 290°, 300°, 310°, 320°, 330°, 340°, 350°, or 360°. Any value for n may be contemplated. When n is 360°, complete-surround environmental sensing can be obtained. In some cases, the environmental sensing range may be defined by a sphere having a predetermined radius from the center of the movable object. The predetermined radius may range from several meters to hundreds of meters. For example, the predetermined radius may be about 1 m, 5 m, 10 m, 20 m, 30 m, 40 m, 50 m, 60 m, 70 m, 80 m, 90 m, 100 m, 200 m, 300 m, 400 m, 500 m, or any values therebetween. In some cases, the predetermined radius may be less than 1 m or greater than 500 m. Any value for the predetermined radius may be contemplated. In some embodiments, the environmental sensing range may depend on an environmental complexity of the environment in which the movable object operates. The environmental sensing range can dynamically adjust as the movable object moves through different environments. For example, when the movable object is moving in an environment comprising a large number of objects or obstacles, the environmental sensing range may be extended, and/or a sensitivity level (e.g., resolution) of the environmental sensing may be increased. Conversely, when the movable object is moving in an environment comprising a low number of objects or obstacles, the environmental sensing range may be reduced, and/or a sensitivity level (e.g., resolution) of the environmental sensing may be decreased.

In FIG. 5, the plurality of imaging devices mounted on different sides of the movable object may collectively constitute an onboard binocular stereo vision sensing system. In some embodiments, the environmental sensing unit may comprise other sensors (such as ultrasonic sensors, radar, laser, and infrared sensors) that can perform the same environmental sensing function, and that can substitute for the binocular stereo vision sensing system. In some embodiments, those other sensors (e.g., ultrasonic sensors, radar, laser, and infrared sensors) may be used in conjunction with the binocular stereo vision sensing system to further increase the sensitivity and/or range of the environmental sensing.

Accordingly, the environmental sensing unit as disclosed herein can provide, precisely and in real-time, environmental information ranging from tens of meters to several hundreds of meters surrounding the movable object. The environmental information may include distances of the movable object from various objects in the environment, as well as distances between objects within the environment.

Figure 6:
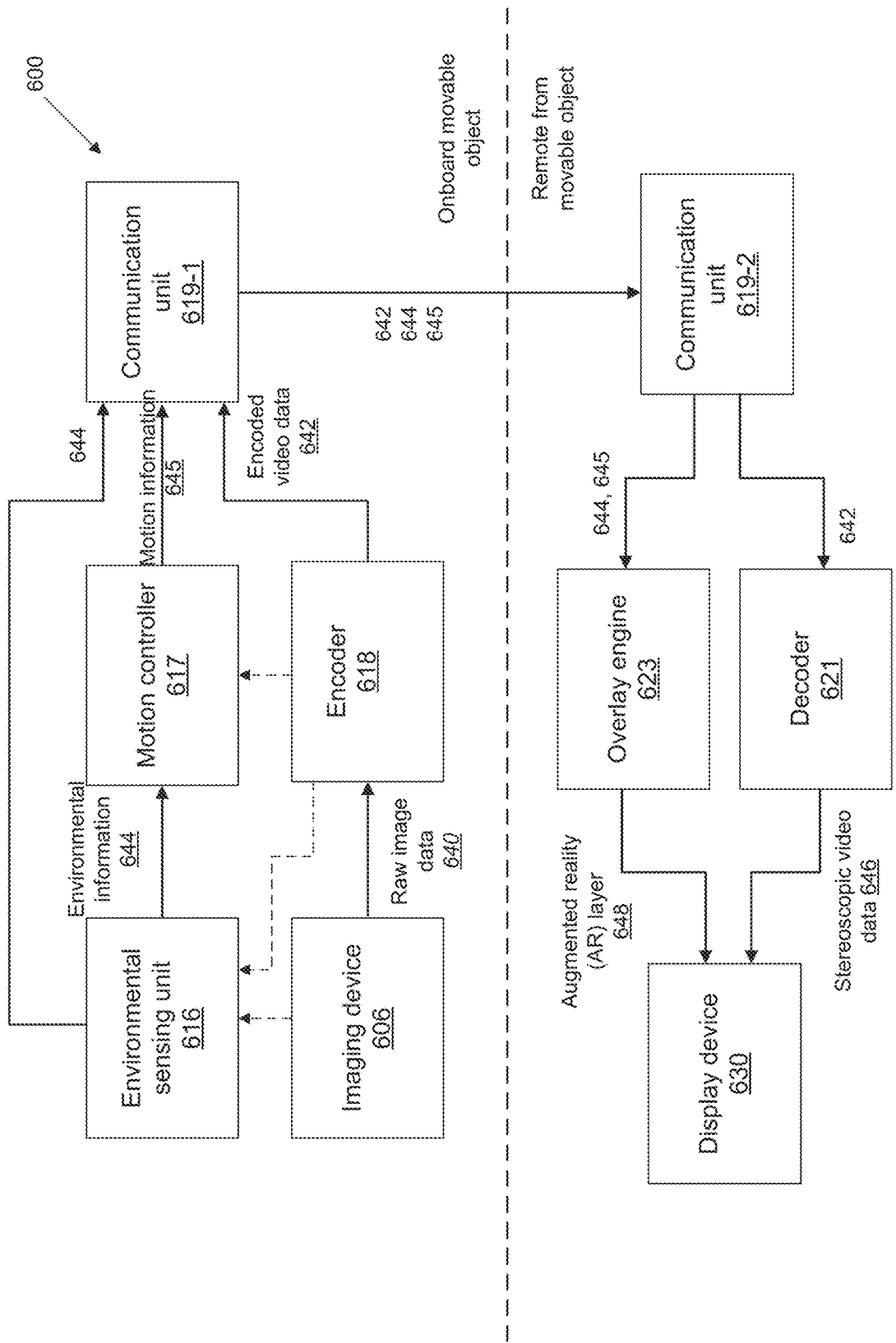
FIG. 6 shows a block diagram illustrating examples of components for fusing stereoscopic video data with environmental information, in accordance with embodiments.

FIG. 6 shows a block diagram illustrating examples of components of a system 600 for fusing stereoscopic video data with environmental information, in accordance with embodiments. The augmented stereoscopic video data may be displayed on a user terminal as a FPV, for example as shown in FIGS. 1, 3, and 4. The components may comprise a first group of components located onboard a movable object, and a second group of components located remotely from the movable object. In some embodiments, one or more components from the second group of components may be located on a user terminal.

The first group of components may comprise an imaging device 606, an environmental sensing unit 616, a motion controller 617, an encoder 618, and a communication unit 619-1. The first group of components may be mounted or co-located on the movable object, such as a vehicle that is capable of traveling in the air, on land, on water, or within a water body. Examples of vehicles may include an aerial vehicle (e.g., UAVs, airplanes, rotor-craft, lighter-than air vehicles), a land-bound vehicle (e.g., cars, trucks, buses, trains, rovers, subways), a water-bound vehicle (e.g., boats, ships, submarines), or space-based vehicles (e.g., satellites, shuttles, rockets). A movable object may be capable of traversing on land or underground, on or in the water, within the air, within space, or any combination thereof. In some embodiments, the movable object may be a mobile device, a cell phone or smartphone, a personal digital assistant (PDA), a computer, a laptop, a tablet PC, a media content player, a video game station/system, wearable devices such as a virtual reality headset or a head mounted device (HMD), or any electronic device capable of capturing, providing or rendering image data, and/or identifying or tracking a target object based on the image data. The movable object may be self-propelled, can be stationary or moving, and may change orientation (e.g., attitude) over time.

In some embodiments, the imaging device 606 may be operably coupled to the movable object via a carrier (e.g., carrier 104 in FIG. 4). Optionally, the imaging device may be disposed within a housing of the movable object. In some alternative embodiments (not shown), the imaging device may be implemented as a stand-alone device and need not be provided on a movable object. In some embodiments, an inertial measurement unit (IMU) (not shown) may be mounted on the imaging device, or on the carrier to which the imaging device is coupled.

The imaging device 606 may serve as an image capture device as described elsewhere herein. The imaging device 606 may be configured to obtain raw image data 640 of an environment in which the movable object operates. The raw image data may correspond to, for example, still images or video frames of a plurality of objects in the environment. Raw image data as used herein may also include raw video data. The encoder as used herein may include a video encoder. The objects can be depicted in still images and/or video frames in a 2D or 3D format, can be real-life and/or animated, can be in color, black/white, or grayscale, and can be in any color space. The objects may be stationary. Alternatively, the objects may be movable, and may be moving or stationary at any given point in time.

As shown in FIG. 6, the imaging device may transmit the raw image data to the encoder 618 to be processed into encoded video data 642. The encoder may be a stand-alone device borne by the movable object or a component of the imaging device. Optionally, the encoder may be off-board the UAV. The encoder may be implemented using one or more processors onboard the movable object. The processors onboard the UAV may include video codec processors for encoding raw image data. In some embodiments, the raw image data and the encoded video data may comprise a plurality of color images, and the plurality of pixels may comprise color pixels. In other embodiments, the raw image data and the encoded video data may comprise a plurality of grayscale images, and the plurality of pixels may comprise grayscale pixels. In some embodiments, each pixel in the plurality of grayscale images may have a normalized grayscale value.

In some embodiments, the encoder may be configured to process raw video data, by encoding the raw video data of the environment to generate stereoscopic video data onboard the movable object. The stereoscopic video data may be generated by fusing together multiple image views in the raw video data. In some embodiments, the raw video data may be encoded using multi-ocular joint encoding. The multi-ocular joint encoding may comprise inter-frame prediction based on positional information of the imaging device. The positional information of the imaging device may be obtained from an IMU. The multi-ocular joint encoding may comprise applying inter-frame prediction between multiple image views captured by the imaging device at a same moment or at different moments. The multi-ocular joint encoding may comprise inter-frame prediction of the plurality of images based on positional information of the imaging device(s) at each time instance that an image is captured.

The raw image data may include raw video data of multiple image views captured at different moments in time. In some embodiments, the multi-ocular joint encoding may comprise applying a Multiview Video Coding (MVC) format to the raw video data. For example, the encoder 618 may be configured to apply the MVC format to the raw video data. Applying the MVC format may comprise (1) correlating the raw video data obtained by the imaging device(s), and (2) reducing information redundancy in the raw video data. In some other embodiments, the multi-ocular joint encoding may comprise applying a High Efficiency Video Coding (HEVC) format to the raw video data. In some embodiments, the raw video data may be encoded by the one or more processors in the encoder 618 substantially in or near real-time as the raw video data is being captured by the imaging device(s).

The environmental sensing unit 616 may be configured to obtain environmental information 644 using one or more sensors, as previously described with reference to FIGS. 4 and 5. The environmental information may comprise an environmental map. The environmental map may comprise a topological map or a metric map. The metric map may comprise at least one of the following: a point cloud, a 3D grid map, a 2D grid map, a 2.5D grid map, or an occupancy grid map. The occupancy grid may be used to define a 3D map of the spatial environment surrounding the movable object.

In some embodiments, the environmental sensing unit 616 may be configured to receive raw image data 640 from the imaging device 606. Alternatively, the imaging device 606 may be part of the environmental sensing unit 616. In some instances, the environmental sensing unit 616 may be configured to receive encoded video data 642 from the encoder 618. The environmental sensing unit may be configured to obtain environmental information from the raw image data and/or the encoded video data. In some embodiments, the environmental sensing unit may be configured to generate a 3D map of the external environment by correlating a binocular image or any image in the raw image data or encoded video data to a depth map, as described elsewhere herein. For example, the environmental sensing unit can map a left-eye image and/or a right-eye image captured by the imaging device 606 to the depth map.

The environmental information can also include wind speed, wind direction, air pressure, air density, humidity, ambient temperature, location of the movable object in an environment, proximity of the movable object to other objects in the environment, obstacle locations, etc. In some cases, the environmental information may comprise a distance of the movable object from an object in the environment, or an orientation of the movable object relative to the object. The movable object may be configured follow or track the object. Alternatively, the object may be an obstacle lying in a motion path of the movable object, and the movable object may be configured to avoid the obstacle.

In some embodiments, the motion controller 617 may be configured to receive the environmental information 644 from the environmental sensing unit, and autonomously or semi-autonomously control the movable object based on the environmental information. In some cases, the motion controller may include an obstacle avoidance unit. The obstacle avoidance unit and/or motion controller may be configured to generate a motion path traversing through passable (open) space within an environmental map such as a 3D map.

The obstacle avoidance unit may be configured to determine whether the movable object will collide with one or more obstacles based on a predicted movement of the movable object along a motion path. In some cases, the obstacle avoidance unit may be configured to adjust the motion path incrementally in at least one direction when the movable object is determined to collide with the one or more obstacles. The obstacle avoidance unit may be further configured to determine, for each incremental angle in the at least one direction, whether the movable object is going to collide with the one or more obstacles.

The obstacle avoidance unit may also determine whether the movable object will collide with the one or more obstacles based on an environmental map. The environmental map may be a 3D map of the environment surrounding the movable object. The 3D map may be generated based on depth information in images of surrounding objects captured by one or more imaging devices in the environmental sensing unit. In some embodiment, the obstacle avoidance unit may be configured to overlay a trajectory indicative of the motion path onto the environmental map, and determine whether the trajectory is proximate to or intersects with the one or more obstacles depicted within the environmental map.

When the trajectory is not proximate to or does not intersect with the one or more obstacles depicted within the environmental map, the obstacle avoidance unit may determine there is no risk or a low risk of collision, and the existing motion path may be provided to the motion controller. Conversely, the obstacle avoidance unit may determine that the movable object will collide with the one or more obstacles when the trajectory is proximate to or intersects with the one or more obstacles depicted within the environmental map.

In some embodiments, the obstacle avoidance unit may incrementally adjust the angle of the motion path in a dynamic manner based on the presence or absence of obstacles in the motion path. For example, when the obstacle avoidance unit detects an obstacle in the motion path, the angle of the motion path may be adjusted in small increments, so as to determine the minimum adjustment in motion path of the movable object to bypass the obstacle. The angle of the motion path may be readjusted in larger increments after the movable object has successfully bypassed the obstacle.

In some embodiments, the obstacle avoidance unit may incrementally adjust the angle of the motion path in a dynamic manner based on a density of obstacles in the motion path. For example, when the obstacle avoidance unit detects a high density of obstacles in the motion path, the angle of the motion path may be adjusted in small increments, so as to determine fine adjustments in motion path of the movable object to bypass the high density of obstacles. Conversely, when the obstacle avoidance unit detects a low density of obstacles in the motion path, the angle of the motion path may be adjusted in larger increments, since there may be more open (passable) space between the obstacles.

The motion controller may be configured to generate motion information 645. The motion information may include a motion path and adjustments to the motion path as described above. The motion information may also include one or more of the following: location in global or local coordinates, attitude, altitude, spatial disposition, velocity, acceleration, directional heading, distance traveled, state of battery power, and/or health of one or more components on the movable object.

The communication unit 619-1 onboard the movable object may be configured to receive encoded video data 642 from the encoder, motion information 645 from the motion controller, and/or environmental information 644 from the environmental sensing unit. In some embodiments, the environmental information may be provided with the motion information from the motion controller to the communication unit 619-1.

The communication unit 619-1 may be configured to transmit the encoded video data, motion information, and environmental information to a communication unit 619-2 remote from the movable object. The communication unit 619-2 may or may not be located at a user terminal. The user terminal may or may not be located on the ground. The user terminal may be located remotely from the movable object. In some instances, the communication unit 619-2 may be located at a ground station in communication with the movable object and the user terminal. The user terminal and the movable object may be in communication with each other via the communication units 619-1 and 619-2. The data/information 642, 644, and 645 may be transmitted from the movable object to the user terminal via a downlink. The user terminal may transmit various control signals (not shown) to the movable object via an uplink. Each of the uplink and the downlink may be wireless link. The wireless link may include a RF (radio frequency) link, a Wi-Fi link, a Bluetooth link, a 3G link, or a LTE link. The wireless link may be used for transmission of image data or control data over long distances. For example, the wireless link may be used over distances equal to or greater than about 5 m, 10 m, 15 m, 20 m, 25 m, 50 m, 100 m, 150 m, 200 m, 250 m, 300 m, 400 m, 500 m, 750 m, 1000 m, 1250 m, 1500 m, 1750 m, 2000 m, 2500 m, 3000 m, 3500 m, 4000 m, 4500 m, 5000 m, 6000 m, 7000 m, 8000 m, 9000 m, or 10000 m.

The bandwidth of the communication between the movable object and the user terminal (between the first and second communication units 619-1 and 619-2) may be in a range from about 10 Kbps to about 1M bps. Different image data compression strategies may be used depending on the current or available communication bandwidth. For example, whole images may be compressed uniformly when the communication bandwidth is fast enough to support real-time image transmission. However, when the communication bandwidth drops to a certain level, it may be switched to a different image compression strategy where different images are selectively compressed at different rates. In some embodiments, the encoded video data may comprise high-definition stereoscopic video data. In other embodiments, the processed video data may comprise ultra high-definition stereoscopic video data.

As shown in FIG. 6, the communication unit 619-1 may be configured to transmit the encoded video data, motion information, and environmental information to a second group of components that are located remotely from the movable object. The second group of components may comprise the communication unit 619-2, a decoder 621, an overlay engine 623, and a display device 630. In some embodiments, one or more components from the second group of components may be located on a user terminal.

The communication unit 619-2 may transmit the encoded video data 642 to the decoder 621. The decoder may be a video decoder, or may comprise a video decoder. The decoder may be implemented using one or more processors at a user terminal and/or at a ground station. In some cases, the decoder may be implemented on the display device 630. The decoder may be configured to decompress the image data. The decoder may be configured to decode the encoded video data to retrieve the stereoscopic video data, and transmit stereoscopic video data 646 to the display device 630. The stereoscopic video data may comprise a plurality of left-eye images and a plurality of right-eye images. The plurality of left-eye and right-eye images may be provided in a stereoscopic video stream that is configured to be displayed on the display device.

The overlay engine 623 may be configured to generate an augmented reality (AR) layer 648 comprising environmental information 644 and/or motion information 645. The AR layer may be a substantially transparent image layer comprising one or more graphical elements. The AR layer may be superposed onto the FPV images or video stream, and displayed on the display device. The transparency of the AR layer allows the stereoscopic video data to be viewed by a user, so that the FPV shows a 3-dimensional video stream of the environment with graphical elements overlay on top of it. In some embodiments, the AR layer may comprise input regions in the augmented FPV that allow the user to interact with one or more graphical elements in the FPV. The user interaction in the augmented FPV may translate to a corresponding real world action that is performed by the movable object and/or an onboard imaging device.

As described above, the fusing of the stereoscopic video data and the environmental information may comprise incorporating the environmental information into the stereoscopic video data. The augmented stereoscopic video data of the environment may comprise one or more graphical elements associated with the environmental information. The graphical elements may be overlay onto the FPV of the environment displayed on the display device. A graphical element can be directly overlay onto an image of any object in the FPV. A graphical element may also include any shape, boundary, or contour surrounding an image of any object in the FPV. The object may or may not be an obstacle in a motion path of the movable object.

In some embodiments, the graphical elements may be configured to dynamically change as a position or an orientation of the movable object relative to an object in the environment changes. For example, a graphical element may indicate a distance of the movable object from a tracked object or an obstacle. The graphical element may be configured to dynamically show the distance of the movable object from the tracked object and/or obstacle substantially in or near real-time on the FPV, as the relative distance between the movable object and the tracked object and/or obstacle changes.

In some embodiments, the environmental information may comprise an orientation of the movable object relative to the tracked object and/or obstacle. The graphical element may indicate the orientation of the movable object relative to the tracked object and/or obstacle. The graphical element may be configured to dynamically show the orientation of the movable object relative to the tracked object and/or obstacle substantially in or near real-time on the FPV, as the orientation between the movable object and the tracked object and/or obstacle changes. In some instances, a graphical element may indicate an orientation or heading of the movable object. To indicate orientation (e.g., direction or heading), the graphical element may be provided in the form of an arrow or a compass. The arrow or compass may point in any direction on the FPV, or towards the images of one or more objects in the FPV. The arrow or compass may be configured to change dynamically based on movement/heading of the movable object, and/or relative orientation between the movable object and one or more other objects in the environment.

In the example of FIG. 6, the stereoscopic video data and the environmental information may be fused together using one or more processors. The one or more processors may be located at the display device 630. Alternatively, the processors may be located at a remote controller or a ground station.

The display device 630 may be located at a user terminal. Alternatively, the display device may be operably coupled to and detachable from the user terminal. In some cases, the display device may be remote from the user terminal. The display device may be configured to display a FPV of the environment based on the augmented stereoscopic video data. A user may view the augmented FPV of the environment on the display device. In some instances, augmented FPV images and/or video of the environment may be shown on the display device in real-time while the imaging device on the movable object is collecting raw image data, and while the environmental sensing unit is collecting environmental information.

The augmented FPV of the environment can be displayed on the display device. In some embodiments, the display device may a wearable display device that is capable of displaying augmented 3-dimensional FPV stereoscopic data of an environment. In some embodiments, the display device may be configured to be worn by a user. For example, the display device may be a pair of glasses, goggles, or head-mounted display. The display device may include any type of wearable computer or device incorporating either augmented reality (AR) or virtual reality (VR) technologies. The display device may be provided as part of the user terminal. Alternatively, the display device may be separate from a user terminal. In some cases, the display device may be operably coupled to a user terminal. Optionally, the display device may itself be a user terminal.

In some embodiments, the display device may be a portable visual system. The display device may be cordless. Alternatively, the display device may be wired to the user terminal, or to another external device. In some embodiments, the display device may be a pair of VR glasses or AR glasses. The VR glasses or AR glasses may be made relatively compact. For example, the VR glasses or AR glasses may be foldable and/or flattened into a 2-dimensional shape for easy storage and portability. In some cases, the display device may be a VR or an AR head-mounted display (HMD).

In some embodiments, the display device may be a device appropriate for displaying images and/or videos, for example, a LCD (Liquid Crystal Display), a CRT (Cathode Ray Tube), an OLED (Organic Light Emitting Diodes), or a Plasma. In some instances, the display may be provided on a mobile device, such as a cellphone, PDA, or tablet.

Figure 7:
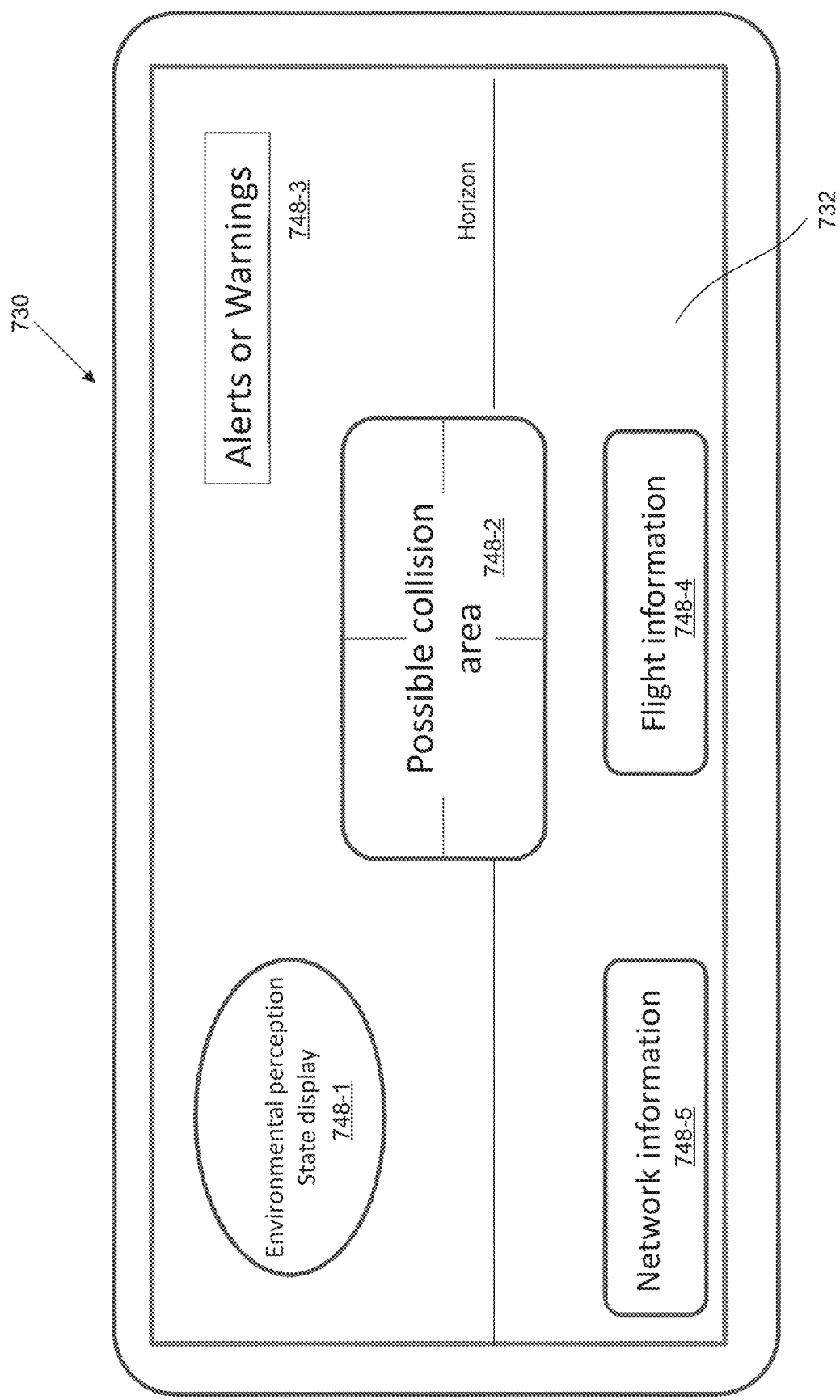
FIG. 7 illustrates the types of information provided in the augmented stereoscopic video data in accordance with some embodiments.

FIG. 7 illustrates the types of information provided in augmented stereoscopic video data in accordance with some embodiments. In FIG. 7, an augmented FPV of an environment may be displayed on a display device remote to a movable object. The augmented stereoscopic video data may be generated by fusing stereoscopic video data and environmental information, as described elsewhere herein.

Referring to FIG. 7, a display device 730 may be configured to display an augmented FPV 732 of an environment. The augmented FPV may include a plurality of graphical elements 748 providing various information that can assist a user in safely navigating the movable object through an environment. The graphical elements may be provided in an AR layer that is superposed over the stereoscopic video stream.

The graphical elements may include various information that can aid a user in FPV control of the movable object. In some embodiments, the graphical elements may indicate an environmental perception state 748-1, a possible collision area 748-2, alerts or warning 748-3, flight information 748-4, and/or network information 748-5.

The environmental perception state 748-1 may be indicative of a health or operational state of one or more sensors in an environmental sensing unit onboard the movable object. For example, when one or more of the sensors malfunctions or stops working, a textual message or a visual indicator may appear on the augmented FPV informing the user about the state of the sensor(s).

The possible collision area 748-2 may indicate objects where there may be a high risk or certainty of the movable object colliding with those objects. Those objects may be obstacles in the environment. The possible collision area 748-2 can mark up the obstacles using one or more types of marking schemes (e.g., shading, coloring, highlighted, etc.). In some cases, one or more bounding boxes may be generated within the AR layer to surround those obstacles. A box may be in any shape, for example an n-sided polygon where n may be any integer greater than 2. Alternatively, the box may be a circle or an ellipse. In some cases, the box may have a shape that matches the contours of the objects (obstacles). The box may serve as a visual indicator to the user, to distinguish obstacles from other objects that do not pose a collision risk.

The alerts or warning 748-3 may notify a user to take appropriate measures to avoid the collision area. In some embodiments, the alerts or warning may include a level of risk associated with the obstacles. The level of risk may be indicative of a likelihood of the movable object colliding with those obstacles, or a level of danger that those obstacles poses to the movable object for a predetermined motion path. In some embodiments, the alerts or warning may include suggested motion path adjustments to mitigate the risk level. The motion path adjustments may be effected autonomously using one or more processors onboard the movable object. Alternatively, a user may manually make the motion path adjustments using a remote controller for controlling the movable object, and/or through the FPV user interface on the display device.

The flight information 748-4 may contain various operational parameters of the movable object, such as motion path, waypoints, speed, acceleration, heading, altitude, etc. Accordingly, a user can receive updated flight information through the augmented FPV as the user is navigating the movable object in an environment.

The network information 748-5 may indicate a strength of the network connectivity between the movable object and the user terminal. The network information may show a network connection status and transmission lag. This information can aid a user in properly maneuvering the movable object. In some instances, the wireless communication between the movable object and the user terminal may be slow due to bandwidth limitations, or weak due to poor reception (e.g., obstruction from buildings). In those instances, there may be a delay between the uplink (user input to the movable object) and downlink (transmission of data to user terminal). Accordingly, the user may adopt extra care in operating the movable object, for example by reducing its speed, moving it to a safe location, or steering clear of obstacles in the environment until the signal reception improves.

Figure 8:
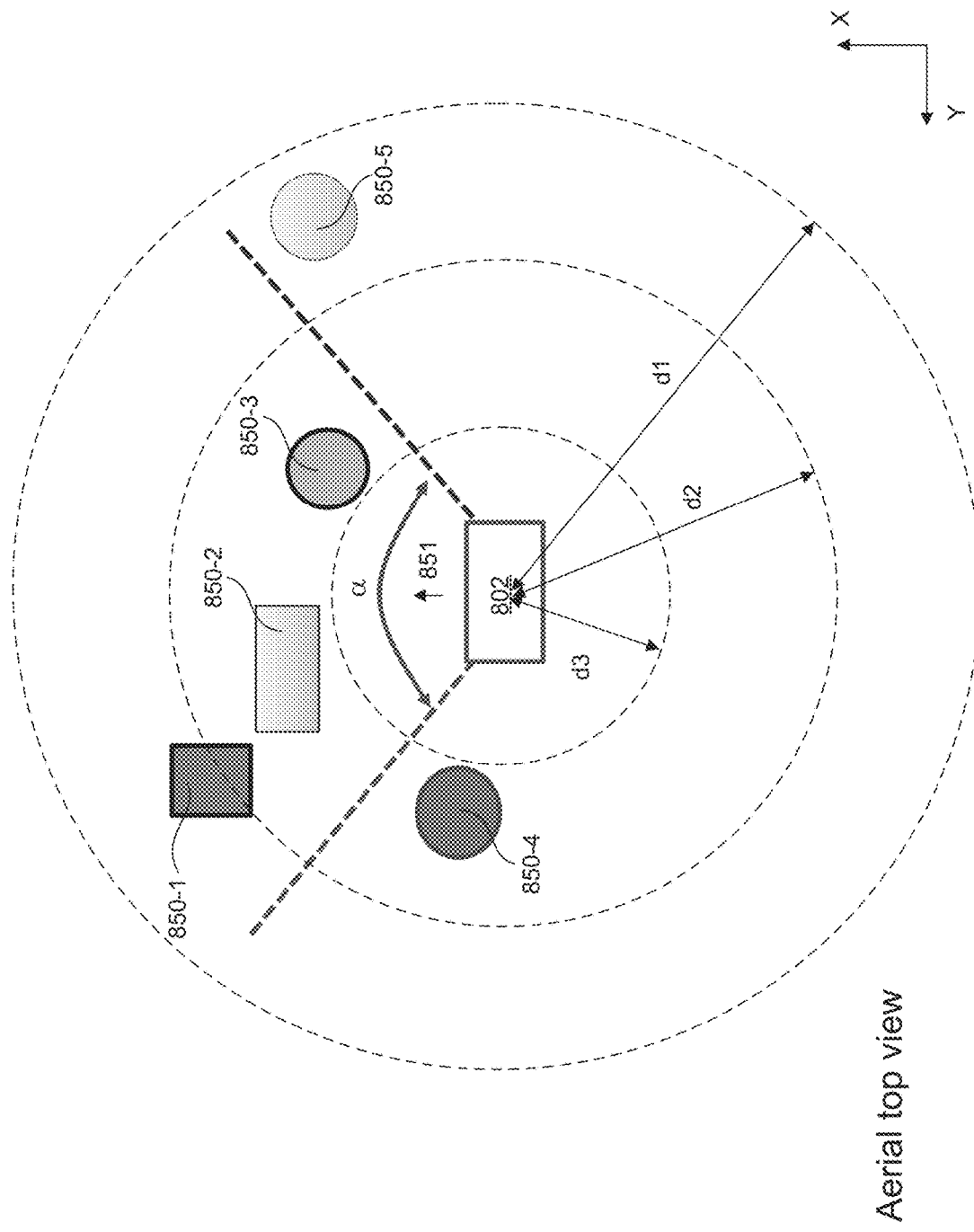
FIG. 8 illustrates a field of view and environmental sensing range of a movable object in accordance with some embodiments.

FIG. 8 illustrates a field of view and environmental sensing range of a movable object in accordance with some embodiments. An aerial view of an environment as viewed from above a movable object 802 is depicted in FIG. 8. The movable object may be stationary or in motion. In the example of FIG. 8, the movable object may be heading in a direction 851 along an X-axis of a reference frame. One or more objects 850 may be located in the environment. The objects may be stationary, moving, or capable of motion. The objects may be located at different distances from the movable object, and from one another.

The movable object may include an imaging device configured to collect image data (e.g., stereoscopic video data) of the environment. The imaging device may have an angle of view α that is determined by the type of lens used. In some cases, the imaging device may use a wide-angle lens. The wide-angle lens may have an angle of view α ranging between 84° and 64°. In some alternative embodiments, the imaging device may be located remotely from the movable object at a different location. Optionally, the imaging device may be located on another movable object.

One or more objects in the environment may lie within the field of view of the imaging device. Conversely, one or more objects in the environment may lie outside the field of view of the imaging device. For example, a first object 850-1, second object 850-2, and third object 850-3 may lie within the field of view of the imaging device, whereas a fourth object 850-4 and a fifth object 850-5 may lie outside the field of view of the imaging device. It should be appreciated that the objects can move in/out the field of the view of the imaging device as the movable object moves or changes its orientation, and/or when an attitude of the imaging device changes.

Different boundaries may be defined around the movable object. The boundaries may be used to determine a relative proximity of one or more objects in the environment to the movable object, as described later in detail with reference to FIG. 9. A boundary can be defined by a regular shape or an irregular shape. As shown in FIG. 8, the boundaries may be defined by circles (in 2-D space) or spheres (in 3-D space) having different radii. (See, e.g., FIG. 5). For example, an edge of a first boundary may be at a distance d1 from the center of the movable object. An edge of a second boundary may have a distance d2 from the center of the movable object. An edge of a third boundary may have a distance d3 from the center of the movable object. The distances d1, d2, and d3 may correspond to the respective radius of the first, second, and third boundaries. In the example of FIG. 8, d1 may be greater than d2, and d2 may be greater than d3. The circles/spheres defined by the boundaries may or may not be concentric to one another. In some alternative embodiments, a center of a shape defined by each boundary need not lie at a center of the movable object. The boundaries can be defined in any manner around the movable object, along one or more planes and/or in 3-dimensional space.

The movable object 802 may be configured to transmit various types of information to a display device. As previously described herein, the information may include encoded video data (comprising stereoscopic video data), environmental information, and/or motion information. The display device may be remote from the movable object. In some cases, the display device may be incorporated into a user terminal, or operably coupled with the user terminal.

Figure 9:
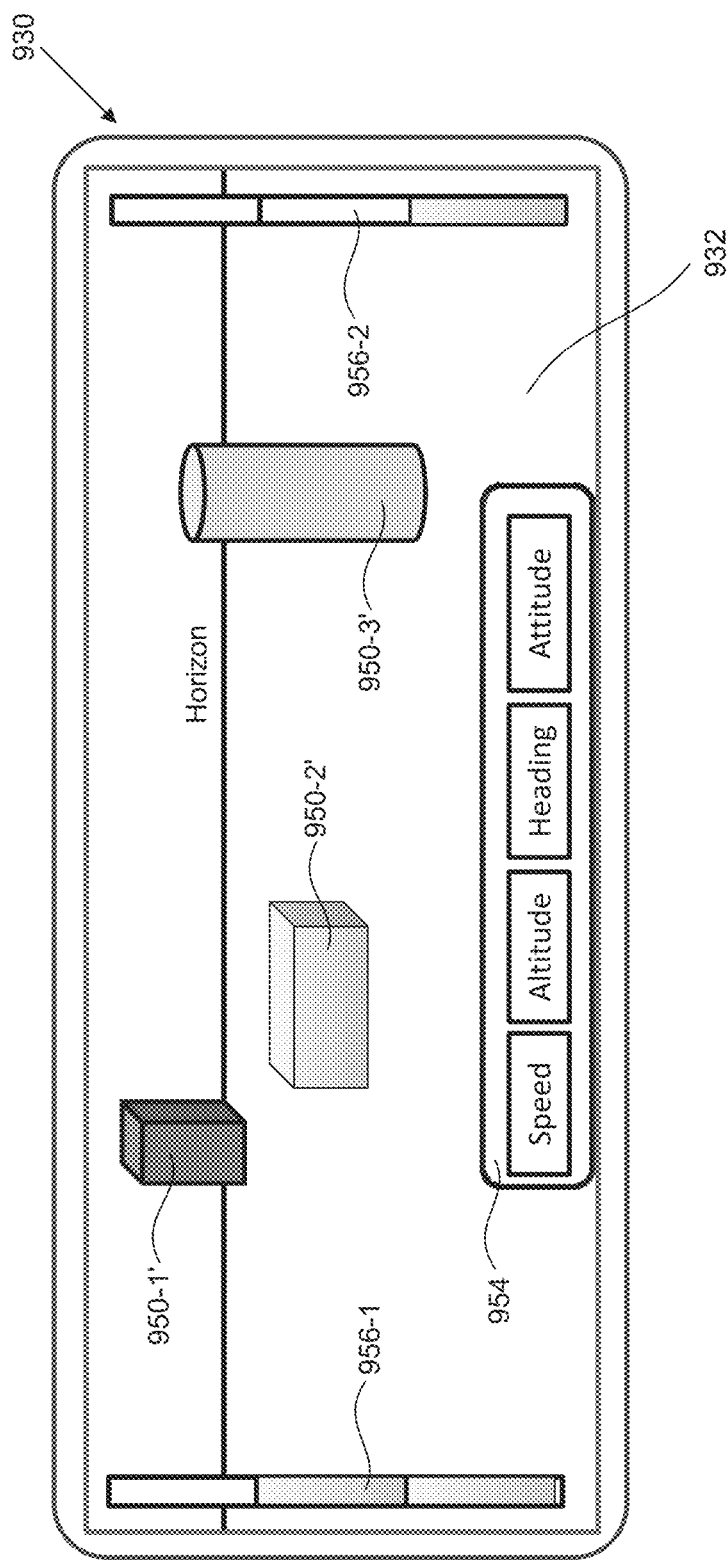
FIG. 9 illustrates an augmented FPV of the environment in FIG. 8, in accordance with some embodiments.

FIG. 9 illustrates an augmented FPV of the environment in FIG. 8 in accordance with some embodiments. An augmented FPV 932 of the environment may be displayed on a display device 930. The objects lying within the field of view of the imaging device in FIG. 8 may be displayed in the FPV. For example, the FPV may include images 950-1', 950-2', and 950-3' of the first object 850-1, second object 850-2, and third object 850-3, respectively. As previously mentioned, when the imaging device uses a wide-angle lens, perspective distortion may occur which extends the relative distances between objects in the FPV (and distorts the relative sizes of objects in the FPV). As a result, the images 950-1', 950-2', and 950-3' may appear to be spaced further apart in the FPV than they would have been in the physical environment.

The FPV 932 may comprise augmented stereoscopic video data. The augmented stereoscopic video data may be generated by fusing stereoscopic video data and environmental/motion information as described elsewhere herein. The environmental information may be collected using an environmental sensing unit onboard the movable object. Likewise, the motion information can be provided from a motion controller onboard the movable object.

In some embodiments, the FPV may alternatively be a graphical depiction or virtual representation of the image from the imaging device. While a FPV is illustrated, other types of views may be presented in alternative or in conjunction with the FPV. For instance, in some embodiments, a map view may be provided. The map view may include a 2D map, such as an overhead map. The map view may include a 3D map. The 3D map may be alterable to view the 3D environment from various angles. Solid renderings, wireframes, or other types of imaging may be shown, as described previously herein.

The environmental information and/or motion information may be incorporated into the FPV through an augmented reality (AR) layer comprising one or more graphical elements. In FIG. 9, the graphical elements may include a dashboard 954 displaying flight information (e.g., speed, altitude, heading, attitude, etc.) of the movable object. The dashboard may be located anywhere in the FPV. For example, the dashboard may be located near a bottom portion of the FPV and away from a central portion of the FPV, to avoid visually interfering with images of objects that are displayed in the central portion of the FPV.

In some embodiments, the graphical elements may include one or more proximity indicators 956 for indicating the movable object's relative proximity to one or more objects lying outside the field of view of the imaging device. The proximity indicators may serve as "blind spot" indicators. Blind spots as used herein may refer to areas that lie outside the field of view of the imaging device that is used to obtain stereoscopic image data for the FPV. In some embodiments, the proximity indicators may be located on a periphery of the FPV. For example, a left proximity indicator 956-1 may be located on a left-most portion of the FPV, and a right proximity indicator 956-2 may be located on a right-most portion of the FPV. The left proximity indicator may be used to indicate the movable object's relative proximity to one or more objects lying outside the field of view of the imaging device, to the left of the movable object. Similarly, the right proximity indicator may be used to indicate the movable object's relative proximity to one or more objects lying outside the field of view of the imaging device, to the right of the movable object.

In some embodiments, a relative proximity can be indicated by a number of bars displayed in the proximity indicator. For example, each proximity indicator may display 0, 1, 2, 3, or any number of bars that are active (for example, illuminated) at any given moment. As an example, zero(0) number of bars in the proximity indicator may indicate that there are no objects or obstacles lying in the blind spot region. When the proximity indicator is displaying one(1) bar, one or more objects may be disposed within the distance d1 to the movable object and outside of the distance d2. Optionally, the proximity indicator may display one(1) bar when one or more objects lie on the circumference of a circle defined by the first boundary. When the proximity indicator is displaying two(2) bars, one or more objects may be disposed within the distance d2 to the movable object and outside of the distance d3. Optionally, the proximity indicator may display two(2) bars when one or more objects lie on the circumference of a circle defined by the second boundary. Likewise, when the proximity indicator is displaying three(3) bars, one or more objects may be disposed within the distance d3 to the movable object. Optionally, the proximity indicator may display three(3) bars when one or more objects lie on the circumference of a circle defined by the third boundary. Accordingly, when the relative proximity between the movable object and the object(s) in the blind spot regions decreases, the number of bars in the proximity indicators may increase correspondingly to indicate the increased risk of collision. Conversely, when the relative proximity between the movable object and the object(s) in the blind spot regions increases, the number of bars in the proximity indicators may decrease correspondingly to indicate the reduced risk of collision.

As shown in FIG. 8, the fourth object 850-4 may be located to the left of the movable object and outside of the field of view of the imaging device. The fourth object may lie within the distance d2 to the movable object and outside of the distance d3. Accordingly, the left proximity indicator may display two(2) bars. Similarly, the fifth object 850-5 may be located to the front right of the movable object and outside of the field of view of the imaging device. The fifth object may lie within the distance d1 to the movable object and outside of the distance d2. Accordingly, the right proximity indicator may display one(1) bar. A user who is controlling the movable object through the augmented FPV can determine the movable object's relative proximity to other objects (located in the blind spot regions) based on the number of bars in the proximity indicators, and maneuver the movable object to avoid collisions with those objects.

In some embodiments, different colors and shading may be used to differentiate the bars in the proximity indicators. For example, when a proximity indicator is displaying one(1) bar, the single bar may be displayed in a first color (e.g., green). When the proximity bar is displaying two(2) bars, the two bars may be displayed in a second color (e.g., orange). When the proximity bar is displaying three(3) bars, the three bars may be displayed in a third color (e.g., red). The colors may be indicative of a collision risk level, with green corresponding to a lowest risk level and red corresponding to a highest risk level. The bars can have any color or combinations of colors. In some embodiments, the colors can be provided over a continuous range or spectrum of colors as the relative proximity of the movable objects to those other objects increases/decreases. Any color scheme or any other visual differentiation scheme (such as shapes, shading, etc.) may be contemplated.

Figure 10:
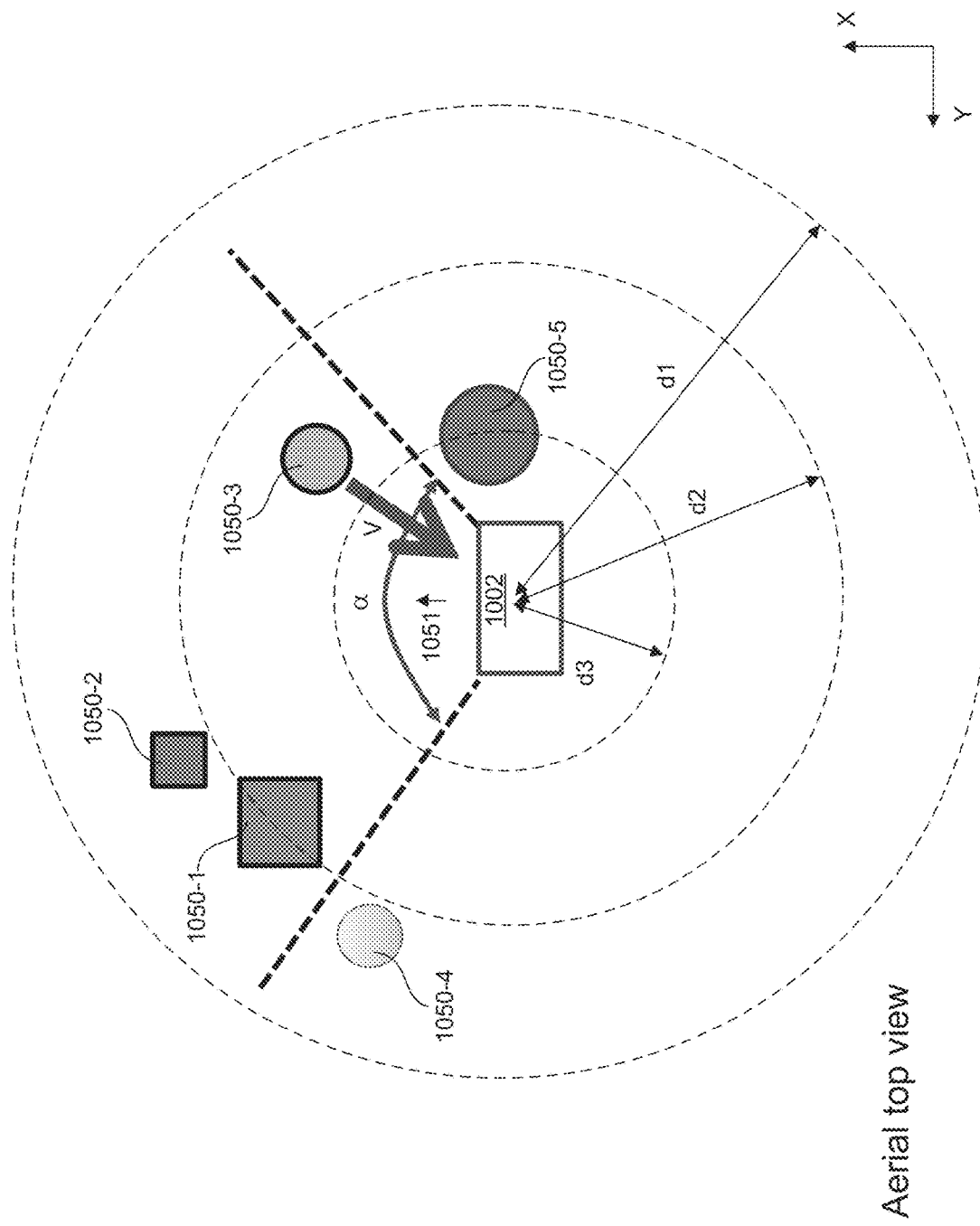
FIG. 10 illustrates a field of view and environmental sensing range of a movable object in accordance with some embodiments.

FIG. 10 illustrates a field of view and environmental sensing range of a movable object in accordance with some embodiments. FIG. 10 may be similar to FIG. 9 except for the following differences. In FIG. 10, one or more objects 1050 in the environment may be capable of motion or in motion. A movable object 1002 may be at risk of colliding with those moving objects.

Referring to FIG. 10, an aerial view of an environment as viewed from above the movable object 1002 is depicted. Different boundaries may be defined around the movable object. The boundaries may be used to determine a relative proximity of one or more objects in the environment to the movable object, as previously described in detail with reference to FIGS. 8 and 9. A first object 1050-1, second object 1050-2, and third object 1050-3 may lie within the field of view of the imaging device, whereas a fourth object 1050-4 and a fifth object 1050-5 may lie outside the field of view of the imaging device. It should be appreciated that the objects can move in/out the field of the view of the imaging device as the movable object moves or changes its orientation, and/or when an attitude of the imaging device changes. In the example of FIG. 10, the movable object 1002 may be heading in a direction 1051 along an X-axis of a reference frame. The third object 1050-3 may be moving in a direction at a velocity V towards the movable object 1002.

The movable object 1002 may be configured to transmit various types of information to a display device. As previously described herein, the information may include encoded video data (comprising stereoscopic video data), environmental information, and/or motion information. The display device may be remote from the movable object. In some cases, the display device may be incorporated into a user terminal, or operably coupled with the user terminal.

Figure 11:
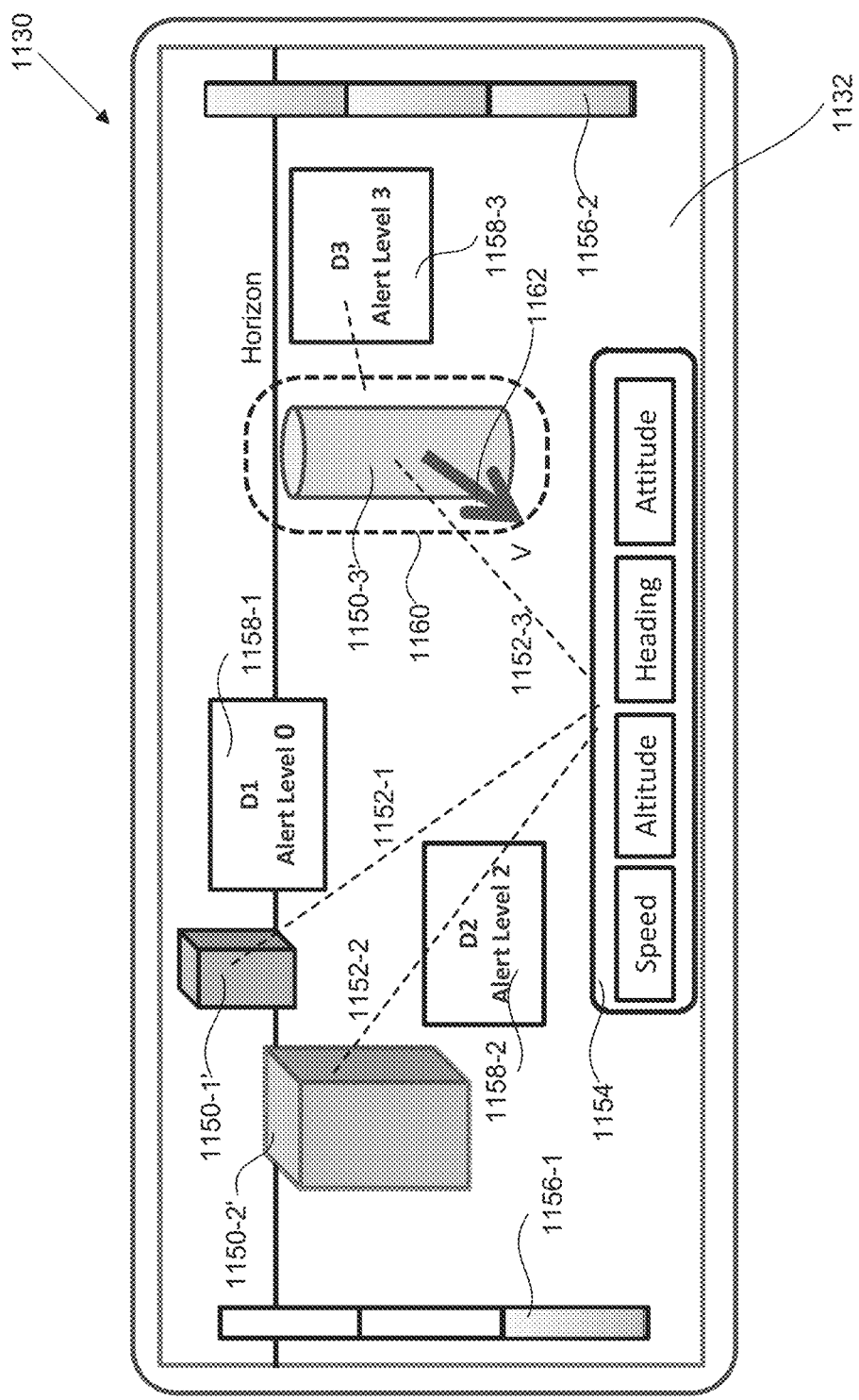
FIG. 11 illustrates an augmented FPV of the environment in FIG. 10, in accordance with some embodiments.

FIG. 11 illustrates an augmented FPV of the environment in FIG. 10, in accordance with some embodiments. FIG. 11 may be similar to FIG. 9 except for the following differences. In FIG. 11, possible collision areas with alerts/warnings may be displayed in an augmented FPV 1132 of the environment on a display device 1130.

As shown in FIG. 11, the objects lying within the field of view of the imaging device may be displayed in the FPV 1132. For example, the FPV may include images 1150-1', 1150-2', and 1150-3' of the first object 1050-1, second object 1050-2, and third object 1050-3. The FPV 1132 may comprise augmented stereoscopic video data. The augmented stereoscopic video data may be generated by fusing stereoscopic video data and environmental/motion information as described elsewhere herein. The environmental information may be collected using an environmental sensing unit onboard the movable object. Likewise, the motion information can be provided from a motion controller onboard the movable object.

The environmental information and/or motion information may be incorporated into the FPV through an augmented reality (AR) layer comprising one or more graphical elements. Similar to FIG. 9, the graphical elements in FIG. 11 may include a dashboard 1154 displaying flight information (e.g., speed, altitude, heading, attitude, etc.) of the movable object. The graphical elements may also include one or more proximity indicators 1156 for indicating the movable object's relative proximity to one or more objects lying outside the field of view of the imaging device. A left proximity indicator 1156-1 may be located on a left-most portion of the FPV, and a right proximity indicator 1156-2 may be located on a right-most portion of the FPV.

Referring back to FIG. 10, the fourth object 1150-4 may be located to the front left of the movable object and outside of the field of view of the imaging device. The fourth object may lie within the distance d3 to the movable object and outside of the distance d2. Accordingly, the left proximity indicator may display one(1) bar. Similarly, the fifth object 1150-5 may be located to the right of the movable object and outside of the field of view of the imaging device. The fifth object may lie on a circumference of a circle defined by the third boundary, whereby an edge of the third boundary has a distance d3 to the center of the movable object 1002. Accordingly, the right proximity indicator may display three (3) bars. A user who is controlling the movable object through the augmented FPV can determine the movable object's relative proximity to those objects (located in the blind spot regions) based on the number of bars in the proximity indicators, and maneuver the movable object to avoid collisions with those objects. For example, the user may maneuver the movable object to move away from the fifth object 1150-5.

As previously mentioned, the augmented FPV 1132 may be configured to display possible collision areas with alerts/warnings. For example, the graphical elements may include one or more alert windows 1158. In some cases, each alert window may be displayed on or adjacent to a corresponding object in the FPV. As shown in FIG. 11, a first alert window 1158-1 may be displayed adjacent to an image 1150-1' of the first object, a second alert window 1158-2 may be displayed adjacent to an image 1150-2' of the second object, and a third alert window 1158-3 may be displayed adjacent to an image 1150-3' of the third object.

Each alert window may contain various types of information, such as a distance D of the corresponding object to the movable object, an alert level associated with the corresponding object, etc. For example, the first alert window 1158-1 may display a distance D1 and an alert level 0, whereby the distance D1 corresponds to the distance of the first object to the movable object, and the alert level 0 indicates that the movable object has a low risk of colliding with the first object (since the first object is located furthest away from the movable object). Similarly, the second alert window 1158-2 may display a distance D2 and an alert level 2, whereby the distance D2 corresponds to the distance of the second object to the movable object, and the alert level 2 indicates that the movable object has a medium risk of colliding with the second object (since the second object is located closer to the movable object than the first object). Likewise, the third alert window 1158-3 may display a distance D3 and an alert level 3, whereby the distance D3 corresponds to the distance of the third object to the movable object, and the alert level 3 indicates that the movable object has a high risk of colliding with the second object (since the third object is located closest to and moving towards the movable object).

The values of D1, D2, and D3 can adjust dynamically to reflect changes in relative distances between the movable object and the objects. Similarly, the alert levels can change dynamically to reflect different collision risk levels as a result of changes in relative distances between the movable object and the objects. The changes in relative distances between the movable object and the objects may occur under one or more of the following circumstances: (1) when the movable object is moving towards or away from an object; (2) when an object is moving towards or away from the movable object; or (3) when the movable object and the object are moving relative to each other. In some embodiments, an alert window may further include an estimated time to collision. For example, the third alert window 1158-3 may display an estimated time remaining before the movable object 1002 collides with the third object 1050-3, assuming both the movable object and third object continue to move along their current motion paths or trajectories.

In some embodiments, the graphical elements may include one or more virtual lines 1152 extending from the user's point of view (POV) towards the images of the objects within the FPV. The user's POV may be located, for example near a bottom portion of the FPV. As shown in FIG. 11, a first virtual line 1152-1 may extend from the POV towards the image 1150-1' of the first object, a second virtual line 1152-2 may extend from the POV towards the image 1150-2' of the second object, and a third virtual line 1152-3 may extend from the POV towards the image 1150-3' of the third object. The virtual lines can adjust dynamically to reflect changes in relative distances between the movable object and the objects in the environment. For example, the third virtual line may decrease in length as the distance between the movable object and the third object decreases. Conversely, a virtual line to another object (not shown) may increase in length as the distance between the movable object and the other object increases. In some embodiments, a virtual line can be used to aid a user in maneuvering the movable object towards or near an object in the environment.

In some embodiments, the graphical elements may further include a bounding box surrounding an image of an object in the FPV. For example, as shown in FIG. 11, a bounding box 1160 may be displayed surrounding the image 1150-3' of the third object. The bounding box may be used to highlight the image 1150-3' of the third object, and to warn a user of an impending collision. The size and/or shape of the bounding box may be configured to change with the size and/or shape of the image 1150-3' of the third object. For example, as the third object approaches the movable object, the size of the image 1150-3' of the third object increases. In some cases, the shape of the image 1150-3' may change due to perspective distortion. Accordingly, the size and/or shape of the bounding box 1160 can adjust dynamically to match the changing contours of the image 1150-3' of the third object. In some embodiments, bounding boxes can have different colors or shading schemes to differentiate one object from another object within the FPV. For example, the bounding box 1160 may be highlighted or shaded in a red glow, to warn a user of the risk of impending collision. In some cases, the bounding box 1160 can include blinking patterns of light of a same color or different colors to catch the user's attention. Any color scheme or any other visual differentiation scheme (such as shapes, shading, etc.) may be contemplated.

In some embodiments, the graphical elements may further include one or more motion indicators indicative of speeds and/or directions of objects in the environment. For example, as shown in FIG. 11, a motion indicator 1162 may be displayed on or near the image 1150-3' of the third object. The motion indicator may include an arrow in a direction in which the third object 1150 is moving. In some embodiments, the motion indicator may further include a speed V of the third object. The motion indicator can adjust dynamically to reflect changes in the motion of an object. For example, in FIG. 11, if the third object starts moving away from the movable object in a different direction, the arrow in the motion indicator can change to point in the new direction. Likewise, if the third object starts to decelerate and slow down, the value of its speed V can adjust dynamically to reflect the change in speed of the third object.

Accordingly, the augmented FPV in FIG. 11 can provide a user with real-time information about the environment, as well as the movable object's spatial relationships with other objects as the movable object moves within the environment. The graphical elements in the augmented reality (AR) layer can change dynamically to reflect changes in the environment and the spatial relationships. As a result, a user's control of the movable object to maneuver in any type of environment can be improved using the augmented FPV disclosed herein.

Figure 12:
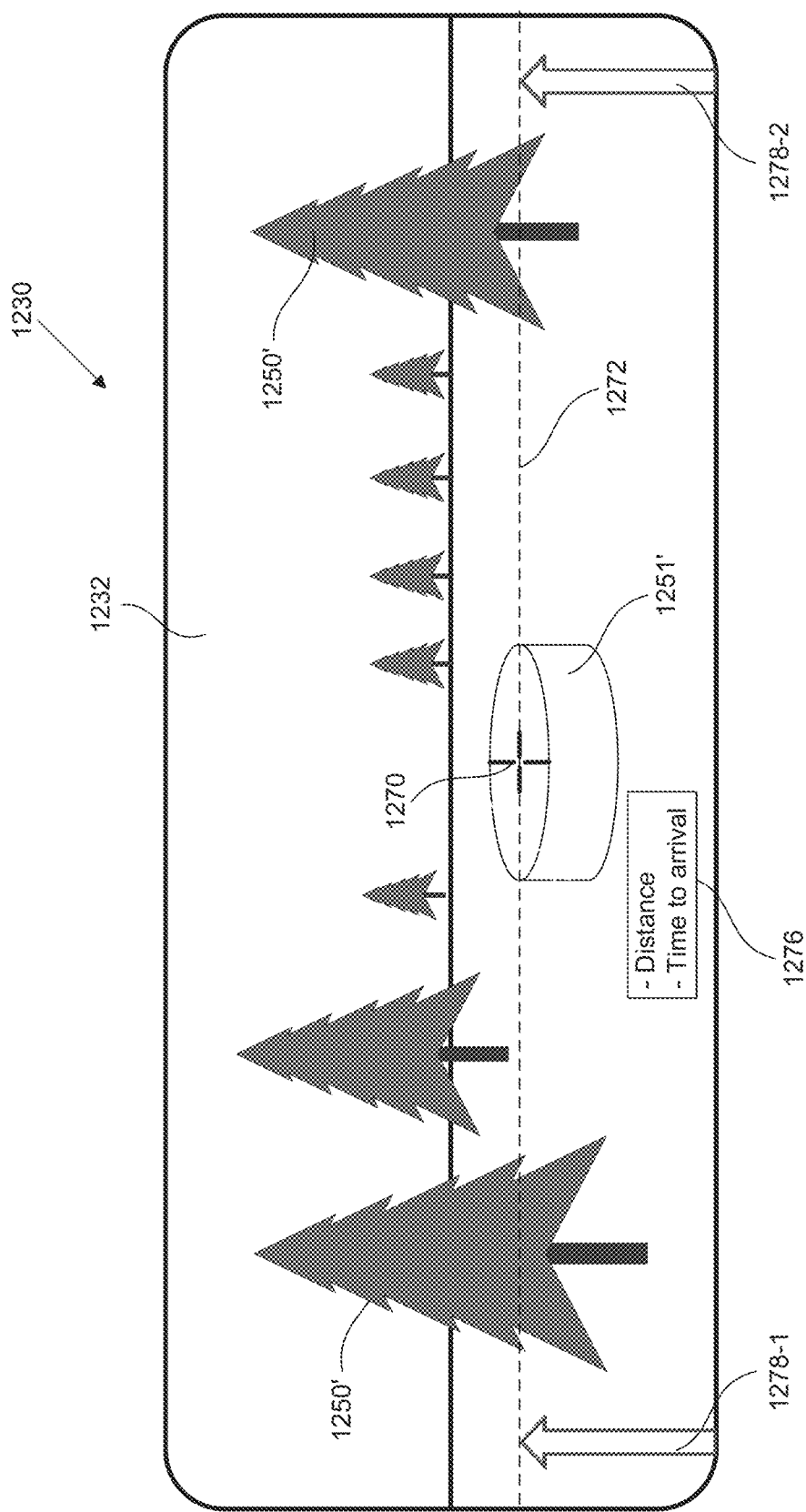
FIG. 12 illustrates an augmented FPV in accordance with some other embodiments.

FIG. 12 illustrates an augmented FPV in accordance with some other embodiments. As shown in FIG. 12, a display device 1230 may be configured to display an augmented FPV 1232 of an environment. The FPV may depict images 1250' of a plurality of objects in the environment. In some embodiments, the environment may include a target object. The FPV may display an image 1251' of the target object. In some cases, the target object may correspond to an object that is to be visually tracked by the imaging device on the movable object. In other cases, the movable object may be configured to fly towards the target object.

The FPV 1232 may include one or more graphical elements that are provided in an augmented reality (AR) layer. As previously mentioned, the AR layer may be superposed over the stereoscopic video stream that is displayed on the display device. In FIG. 12, the graphical elements may include a marker 1270. The marker may be aligned to any object that is displayed in the FPV. For example, the marker may be aligned to the image 1251' of the target object. In some embodiments, the marker may be located in a fixed position within the FPV (for example, at a center of the FPV). In other embodiments, the marker can be moved to different locations within the FPV. In some cases, a user can control the movable object to fly towards the target object by moving and/or aligning the marker on the target object.

In some embodiments, one or more graphical elements can be used to aid a user in maneuvering towards the target object. For example, a reference line 1272 may be displayed intersecting the marker 1270. The reference line may extend across the FPV, and may be relative to a horizon line in the FPV. Changes in the pitch and/or roll of the movable object (or imaging device) may cause the orientation of the reference line to change relative to the horizon line. For example, the reference line may appear to move towards or away the horizon line, or rotate relative to the horizon line when the movable object (or imaging device) pitches and/or rolls. In some embodiments, one or more arrows 1278 may be provided extending towards the reference line 1272. The arrows 1278 may be displayed on a periphery of the FPV. For example, a first arrow 1278-1 may be displayed on the left-most portion of the FPV extending towards the reference line, and a second arrow 1278-2 may be displayed on the right-most portion of the FPV extending towards the reference line.

In some embodiments, the graphical elements may further include a tracking window 1276. The tracking window may include various information relating to the target object. For example, in some instances, the tracking window may include a distance of the target object from the movable object, and/or an estimated time of arrival of the movable object to the target object. Any type of environmental information and/or motion information may be provided in the tracking window, consistent with one or more of the previously described embodiments. In some embodiments, the tracking window may be updated to include new information (e.g., distance information) when a new target object is selected.

In some embodiments, a user can select any point or region, by clicking on the point or drawing a shape around the region, to determine relative positional information which may include distance, orientation, type of object, and/or whether an object is an obstacle lying in a motion path of the movable object. In some embodiments, the user can select any point or region by changing his or her eye gaze. For example, a display device may be capable of tracking a user's eye movement to determine regions of interest.

In some embodiments, a user may interact with the display device by selecting different points or objects in the FPV. The user may select a portion of the FPV to select a target. The selected portion may optionally be a point. The point may be located on the target as shown on the display. In some embodiments, the point may be located proximate to the target as shown on the display. The target may be automatically selected when the user selects the point. In some cases, the target may be marked using one or more types of marking schemes (e.g., shading, coloring, highlighted, etc.) to indicate that the target has been selected. In some cases, a pop-up window may appear at the target on the display requesting confirmation from the user whether the user wishes to select the target. In some embodiments, a plurality of bounding boxes may be generated in the vicinity of the selected point. Each bounding box may be associated with a different target. A user may be presented with the option to select a target by selecting the respective bounding box. In some instances, a user may select more than one target. In those instances, the movable object may be configured to fly first to a nearer target and then to a target that is further away.

Identification of a target from the FPV may be based on spatial information of objects/features obtained from, for example the 3D map, a depth, and/or an occupancy grid. For example, identification of a target by selecting a point on an image in the FPV may be performed using a category-independent segmentation algorithm. For example, when a user selects a point on or in the vicinity of the target on the image in the FPV, the target may be segmented from adjacent or surrounding objects. The segmentation may proceed without knowing which object category the target may fall into. In some cases, the segmentation algorithm may generate a plurality of seed regions in the image(s) and ranks each region, such that top-ranked regions are likely to be good segmentations of different objects (i.e., correspond to different objects).

In some cases, the target may be selected based on moving target detection. In those instances, the movable object and its surrounding environment are assumed to be static/stationary, and the target to be tracked may be the only moving object in the image. The target can be identified and selected through background subtraction.

In some cases, identification of a target may be based on feature point recognition. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that are rich in terms of informational content (e.g., significant 2D texture). A feature point may be detected in portions of an image that are stable under perturbations (e.g., when varying illumination and brightness of an image).

Feature points can be detected using various algorithms (e.g., texture detection algorithm) which may extract one or more feature points from image data. The algorithms may additionally make various calculations regarding the feature points. For example, the algorithms may calculate a total number of feature points, or "feature point number." The algorithms may also calculate a distribution of feature points. For example, the feature points may be widely distributed within an image (e.g., image data) or a subsection of the image. For example, the feature points may be narrowly distributed within an image (e.g., image data) or a subsection of the image. The algorithms may also calculate a quality of the feature points. In some instances, the quality of feature points may be determined or evaluated based on a value calculated by algorithms mentioned herein (e.g., FAST, Corner detector, Harris, etc).

The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

In some embodiments, a feature point may comprise one or more non-salient features. As used herein, non-salient features may refer to non-salient regions or non-distinct (e.g., non-recognizable) objects within an image. Non-salient features may refer to elements within an image that are unlikely to stand out or catch attention of a human observer. Examples of non-salient features may include individual pixels or groups of pixels that are non-distinct or non-identifiable to a viewer, when viewed outside of the context of their surrounding pixels.

In some alternative embodiments, a feature point may comprise one or more salient features. Salient features may refer to salient regions or distinct (e.g., recognizable) objects within an image. As used herein, salient features may refer to salient regions or distinct (e.g., recognizable) objects within an image. Salient features may refer to elements within an image that are likely to stand out or catch attention of a human observer. A salient feature may have semantic meaning. Salient features may refer to elements that may be identified consistently under computer vision processes. A salient feature may refer to animate objects, inanimate objects, landmarks, marks, logos, obstacles, and the like within an image. A salient feature may be persistently observed under differing conditions. For example, a salient feature may be persistently identified (e.g., by a human observer or by computer programs) in images acquired from different points of view, during different times of the day, under different lighting conditions, under different weather conditions, under different image acquisition settings (e.g., different gain, exposure, etc), and the like. For example, salient features may include humans, animals, faces, bodies, structures, buildings, vehicles, planes, signs, and the like.

Salient features may be identified or determined using any existing saliency calculating methods. For example, salient features may be identified by contrast based filtering (e.g., color, intensity, orientation, size, motion, depth based, etc), using a spectral residual approach, via frequency-tuned salient region detection, via a binarized normed gradients for objectness estimation, using a context-aware top down approach, by measuring visual saliency by site entropy rate, and the like. For example, salient features may be identified in a saliency map that is generated by subjecting one or more images to contrast based filtering (e.g., color, intensity, orientation, etc). A saliency map may represent areas with feature contrasts. A saliency map may be a predictor where people will look. A saliency map may comprise a spatial heat map representation of features or fixations. For example, in a saliency map, salient regions may have a higher luminance contrast, color contrast, edge content, intensities, etc than non-salient regions. In some embodiments, salient features may be identified using object recognition algorithms (e.g., feature based methods, appearance based methods, etc). Optionally, one or more objects or types of patterns, objects, figures, colors, logos, outlines, etc may be pre-stored as possible salient features. An image may be analyzed to identify salient features that are pre-stored (e.g., an object or types of objects). The pre-stored salient features may be updated. Alternatively, salient features may not need to be pre-stored. Salient features may be recognized on a real time basis independent to pre-stored information.

The precision to which the user may specify a point in the FPV may be on the order of 0.01 degrees or less, 0.05 degrees or less, 0.1 degrees or less, 0.5 degrees or less, 1 degree or less 2 degrees or less, 3 degrees or less, 5 degrees or less, 7 degrees or less, 10 degrees or less, 15 degrees or less, 20 degrees or less, or 30 degrees or less.

The movable object may travel towards the target that is indicated by the selected point in the FPV. A motion path for the movable object may be defined from the current location of the movable object to the location of the target. The motion path may be denoted by a vector between the current location of the movable object to the location of the target.

When a user selects a portion of the image in the FPV to specify a target, a motion path to the selected target may or may not be visually indicated on the screen. For instance, a visual marker may be provided within the image indicative of the motion path to the target object. The visual marker may be a point, region, icon, line, or vector. For instance, the line or vector may be indicative of a direction of the motion path towards the target. In another example, the line or vector may be indicative of the direction that the movable object is heading.

In some embodiments, a user may specify that the movable object is in a target mode. When the movable object is in a target mode, the portion of the image selected by the user may determine the target towards which the movable object will travel until it encounters obstacles, or when another different target is selected, or when the movable object encounters flight restrictions. The movable object may travel towards the target object until it encounters a stop or change criteria, such as a target change, flight restriction, flight mode change, low power supply or obstacle. The user may specify that the movable object is in a target mode by selecting the target mode from one or more available modes.

Any other user interface tools or techniques may be provided that can allow a user to specify a target object or a target direction in the FPV. The user may select the target object or the target direction by selecting a portion of an image in the FPV with aid of a user interactive external device (e.g., handheld controller, mouse, joystick, keyboard, trackball, touchpad, button, verbal commands, gesture-recognition, attitude sensor, thermal sensor, touch-capacitive sensors, or any other device), as described elsewhere herein.

Figure 13:
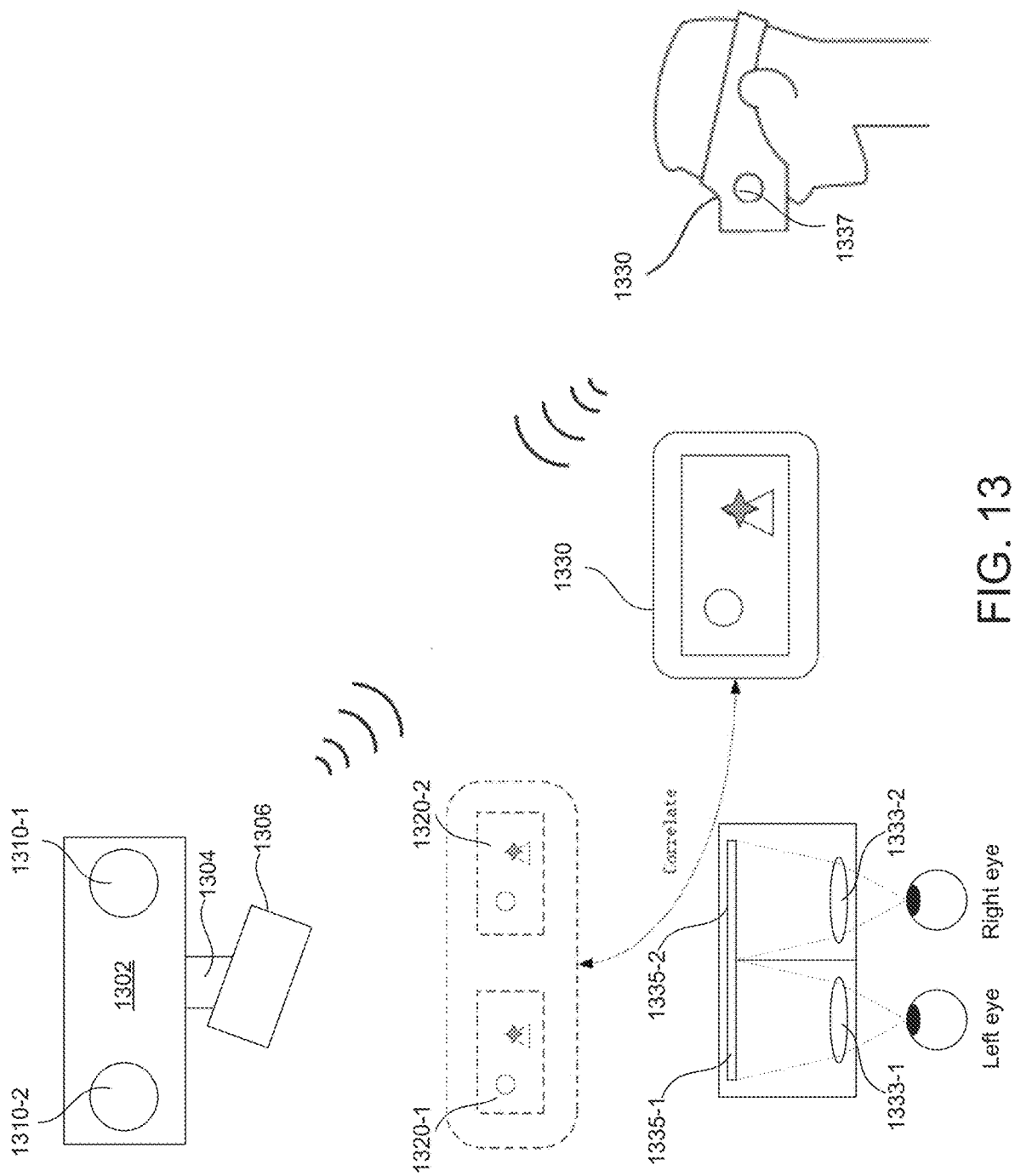
FIG. 13 illustrates an example of a head-mounted display (HMD) for displaying an augmented FPV, in accordance with some embodiments.

FIG. 13 illustrates an example of a head-mounted display (HMD) for displaying an augmented FPV in accordance with some embodiments. A user terminal may include a head-mounted display (HMD) 1330 configured to display an augmented FPV of an environment in which a movable object 1302 operates. The movable object may include a plurality of imaging devices 1310-2, 1310-2, and 1306, as described elsewhere herein. For example, the imaging devices 1310-2 and 1310-2 may be used for environmental sensing, and the imaging device 1306 may be used for generating stereoscopic video data of the environment. In some embodiments, the imaging devices 1310-2 and 1310-2 can also be used to generate stereoscopic video data of the environment.

The movable object may be configured to transmit the stereoscopic video data, environmental information, and/or motion information to the user terminal which is remote to the movable object. The HMD may be configured to display an augmented FPV of the environment based on augmented stereoscopic video data. The augmented stereoscopic video data can be generated by fusing the stereoscopic video data with environmental/motion information. A user can use the user terminal or HMD to control the movable object and/or the imaging devices, as described elsewhere herein.

In some embodiments, the HMD may include a head strap for mounting the HMD to the user's head. The HMD may also include a lens assembly 1333 and a display screen 1335. The display screen may be partitioned into a first display area 1335-1 configured to display a left eye image 1320-1 and a second display area configured to display a right eye image 1320-2. The lens assembly may include a left eye lens 1333-1 for focusing the left eye image for the user's left eye, and a right eye lens 1333-2 for focusing the right eye image for the user's right eye. The left and right eye lenses may include any type of optical focusing lenses, for example, convex or concave lenses. When the user looks through a left eye-piece and a right eye-piece in the HMD, the user's left eye will only see the left eye image (as focused by the left eye lens), and the user's right eye will only see the right eye image (as focused by the right eye lens). The left and right eye images may be stereo matched to generate a 3-dimensional FPV of the environment that is displayed on the HMD. The 3-dimensional FPV may be augmented with environmental/motion information, as described elsewhere herein.

In some embodiments, a sensor 1337 on the HMD can capture a user's head movement, such as rotation about an axis (e.g., pitch, roll, or yaw rotation), as well as forward and backward movement. The head movement information can be converted into a control signal and sent to the movable object in order to control the movement of the movable object 1302 and/or imaging device 1306. The control of the imaging device 1306 may include controlling an orientation of the imaging device using a carrier 1304 that couples the imaging device to the movable object.

In some embodiments, control of the carrier may be coupled with control of the movable object. For example, in some cases, the coupling can be full, meaning that the state of the HMD can be the final state of the imaging device's viewfinder. Specific implementation can be autonomously determined using one or more processors onboard or remote from the movable object, based on the movable object's state, its location, and automatic compensation by the carrier. In other embodiments, this coupling can be partial. For example, the yaw axis may be completely controlled by the state of the movable object. For a partial coupling, some motions may result in control of one of the movable object and/or carrier, while other motions may result in control of the other of the movable object and/or carrier. In some embodiments, the imaging device on the movable object can move in accordance with the user's head (or HMD) movement. For example, when the user tilts his head (or HMD) upwards or downward, the imaging device may pitch upwards or downwards in a corresponding manner. Conversely, when the user rotates his head (or HMD) to the left or right, the imaging device may yaw to the left or right in a corresponding manner. Alternatively, when the user tilts his head (or HMD) to the left or right, the imaging device may roll to the left or right in a corresponding manner. In the above embodiments, the FPV depicted in the HMD can dynamically change to reflect the new field-of-view of the imaging device based on the user's head movement.

The HMD can support a variety of wireless connection (such as a radio frequency RF, infrared, Bluetooth, and rapid identification codes, etc.) to identify the movable object and/or imaging device(s), and to determine whether the movable object and/or imaging device(s) can be manipulated before initiating a control operation. Once the HMD has identified the movable object and/or imaging device(s), an on-screen control panel may appear on the HMD with a FPV of the environment. The FPV may be augmented with one or more graphical elements. The graphical elements may contain environmental and/or motion information that can aid a user in navigating the movable object through an environment from the FPV.

In some embodiments, the HMD in FIG. 13 can be replaced by a pair of VR or AR enabled glasses. The glasses may be configured to display an augmented FPV of an environment in which the movable object operates. Similarly, the glasses may include a left eye display for displaying left eye images and a right-eye display for displaying right eye images. When a user is wearing the glasses, the user's left eye may see a left eye image displayed, and the user's right eye may see a right eye image displayed. The left and right eye images may be used to generate a 3-dimensional stereoscopic FPV of the environment.

In some embodiments, the VR or AR enabled glasses may include a built-in sensor (e.g., an inertial measurement unit) for determining the posture information of the user's head. Posture changes or movements of the head or a neck rotation can be used control the state of the movable object and/or one or more imaging devices coupled to the movable object. The state may include, for example, an orientation of the field of view of the imaging device(s). The imaging device (s) may be operably coupled to the movable object via a multi-axis carrier. In the case of three-axis gimbal, rotation of the user's head in each axis may correspond to the carrier's movement in the corresponding axis. In some examples, rotation of the user's head about each axis may correspond to movement of a payload in each corresponding axis. Such movement may be effected by actuation of the carrier, the movable object, or a combination thereof.

In some embodiments, the sensor on the VR or AR enabled glasses can capture head movement or posture change, convert the captured information into control signals, and transmit the control signals to the movable object via a wireless connection. In some embodiments, the glasses may include a camera. Images taken by the camera can be transmitted in real time back to the display on the glasses. In some embodiments, the camera on the glasses can determine the head's movement or posture change based on the movement of objects in the surrounding environment. Fusion of information from two sources (e.g., sensor and camera on the glasses) can result in a more accurate capture of the head's movement or posture change. In some embodiments, another camera on the glasses can be used to capture a user's eye movement in order to control the state of the movable object and/or imaging device(s).

The VR or AR enabled glasses can support a variety of wireless connection (such as a radio frequency RF, infrared, Bluetooth, and rapid identification codes, etc.) to identify the movable object and/or imaging device(s), and to determine whether the movable object and/or imaging device(s) can be manipulated before initiating a control operation. Once the glasses have identified the movable object and/or imaging device(s), an on-screen control panel may appear on the glasses' display with an augmented FPV of the environment. A user can control the movable object and/or the imaging device(s) through the panel or augmented FPV.

Figure 14:
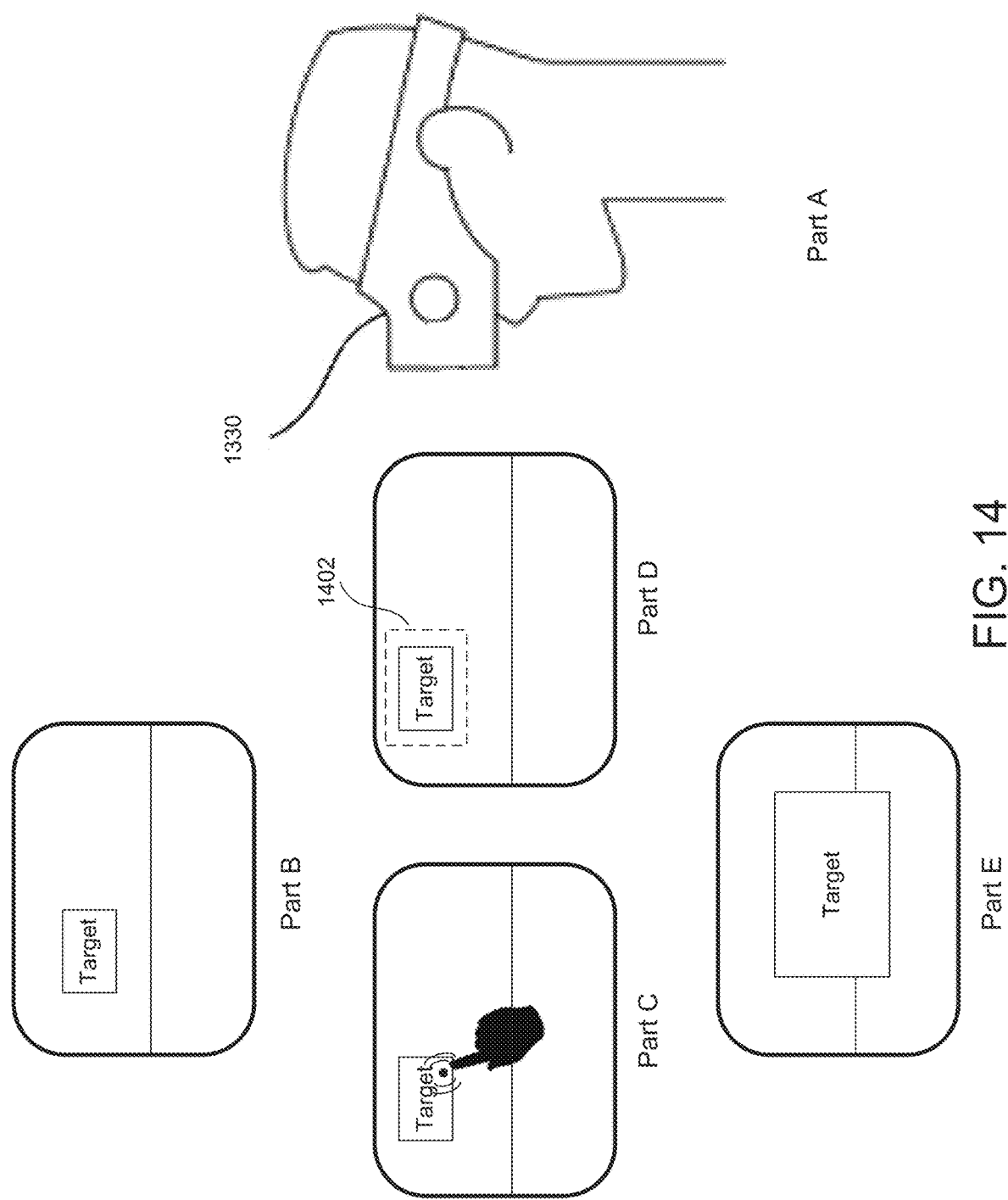
FIG. 14 shows an example of a user interface (UI) in an augmented FPV through which a user may select a target and cause a movable object to move towards or track the target.

FIG. 14 shows an example of a user interface (UI) in an augmented FPV through which a user may select a target and cause a movable object to move towards the target. Part A of FIG. 14 shows a user terminal including a head-mounted display (HMD) 1330 configured to display an augmented 3-D FPV of an environment in which a movable object operates, similar to that shown in FIG. 13.

Part B shows an initial 3-D FPV of an environment comprising a target. The 3-D FPV may include live streaming stereoscopic video obtained using an imaging device on a movable object. The target lies within the field of view of the imaging device. In some cases, the target may be a stand-alone object. In other cases, the target may be surrounded by or proximate to one or more other objects. The target may be stationary and/or capable of movement. The movable object may be stationary or moving while the initial 3-D FPV of the environment is being displayed on the HMD.

A user can interact with the 3-D FPV by selecting different points or objects in the display. Part C shows a user selecting a target within the initial 3-D FPV. The user may select a portion of the image to select the target. The portion of the image selected by the user may be a point. The point may be located on the target as shown on the 3-D FPV. In some embodiments, the point may be located proximate to the target as shown on the 3-D FPV. The target may be automatically selected when the user selects the point. In some cases, the target may be marked using one or more types of marking schemes (e.g., shading, coloring, highlighted, etc.) to indicate that the target has been selected. In some cases, a pop-up window may appear at the target on the display requesting confirmation from the user whether the user wishes to select the target. In some embodiments, a plurality of bounding boxes may be generated in the vicinity of the selected point. Each bounding box may be associated with a different target. A user may be presented with the option to select a target by selecting the respective bounding box. In some instances, a user may select more than one target. In those instances, the movable object may be configured to fly first to a nearer target and then to a target that is further away.

The target may be identified from a 2D image, one or more stereoscopic images, or from a 3D map. Identification of a target from a 3D map may be based on spatial information of objects/features obtained from, for example a 3D map and/or an occupancy grid as described elsewhere herein.

Identification of a target by selecting a point on the image may be performed using a category-independent segmentation algorithm. For example, when a user selects a point on or in the vicinity of the target on the image, the target may be segmented from adjacent or surrounding objects. The segmentation may proceed without knowing which object category the target may fall into. In some cases, the segmentation algorithm may generate a plurality of seed regions in the image(s) and ranks each region, such that top-ranked regions are likely to be good segmentations of different objects (i.e., correspond to different objects).

In some cases, the target may be selected based on moving target detection. In those instances, the movable object and the surrounding environment are assumed to be static/stationary, and the target to be tracked may be the only moving object in the image. The target can be identified and selected through background subtraction. Additionally, identification of a target may also be based on feature point recognition, as described elsewhere herein.

The precision to which the user may specify a point may be on the order of 0.01 degrees or less, 0.05 degrees or less, 0.1 degrees or less, 0.5 degrees or less, 1 degree or less 2 degrees or less, 3 degrees or less, 5 degrees or less, 7 degrees or less, 10 degrees or less, 15 degrees or less, 20 degrees or less, or 30 degrees or less.

The movable object may travel towards the target that is indicated by the selected point in the 3-D FPV. A motion path for the movable object may be defined from the current location of the movable object to the location of the target. The motion path may be denoted by a vector between the current location of the movable object to the location of the target. In some embodiments, the movable object may be configured to track the target as the target moves within the environment.

When a user selects a portion of the 3-D FPV to specify a target, a motion path to the selected target may or may not be visually indicated on the display. In some instances, a visual marker may be provided within the image indicative of the motion path to the target object. The visual marker may be a point, region, icon, line, or vector. For instance, the line or vector may be indicative of a direction of the motion path towards the target. In another example, the line or vector may be indicative of the direction that the movable object is heading.

In some embodiments, a user may specify that the movable object is in a target mode. When the movable object is in a target mode, the portion of the image selected by the user may determine the target towards which the movable object will travel until it encounters obstacles, or when another different target is selected, or when the movable object encounters flight restrictions. The movable object may travel towards the target object until it encounters a stop or change criteria, such as a target change, flight restriction, flight mode change, low power supply or obstacle. The user may specify that the movable object is in a target mode by selecting the target mode from one or more available modes, such as a directional mode. Any other user interface tools or techniques may be provided that may allow a user to specify a target object using the user interface.

In some instances, after the target has been selected, a marking or identification scheme may be used in the display to indicate that the target has been selected. For example, part D of FIG. 14 shows a box 1402 surrounding the selected target in the 3-D FPV. The box may be in any shape, for example an n-sided polygon where n may be any integer greater than 2. In FIG. 14, the box is a 4-sided polygon (quadrilateral-shaped). The box may serve as a visual indicator to the user, to distinguish the selected target from adjacent objects. In some embodiments, a prompt window (not shown) may appear in or near the box, requesting confirmation from the user on whether the selected target corresponds to an intended target of the user. A user may confirm the selected target by clicking on the box.

Part E of FIG. 14 shows an image of the target after the movable object has moved towards the target. For instance, as viewed in the 3-D FPV, when the movable object is traveling towards the target, an object that was once further away may become closer up. In some instances, the movable object may move towards the target until it is offset from the target by a predetermined distance. The predetermined distance may include a horizontal distance component and/or a vertical distance component. The movable object may stay at the predetermined distance from the target. In some cases, the movable object may remain outside of the predetermined distance to the target. The predetermined distance may be determined based on a size of the target and an initial distance from the movable object to the target. The predetermined distance may be automatically generated, or optionally adjustable by a user. For example, if a user desires to move the movable object closer to the target, the user may select (e.g., "click") the target in the image multiple times to adjust the predetermined distance. Adjustment of the distance may optionally depend on a length of time which the user selects (e.g., touches) the target in the image. In some embodiments, the predetermined distance may be dynamically calculated based on factors such as a size of the target and an initial distance of the movable object from the target.

A user may control motion of the movable object by interacting with a user interface in the 3-D FPV in a number of different configurations. For example, when a user selects a point on the target in the 3-D FPV, the movable object may move towards the target. Optionally, when the user selects a point located below the target in the image, the movable object may move backward along its original motion path and away from the target. Alternatively, selecting a point above the target in the image may cause the movable object to move forward. In some cases, double-clicking (or touching) the target in the image multiple times may cause the movable object to move closer to the target. It is noted that any form of interaction of the user with the user terminal/output device to control various functions of the motion of the movable object may be contemplated.

In some instances, when a user specifies a target, the movable object may travel towards the target at a fixed velocity or at a variable velocity. A standard target travel velocity may be provided. A variable target travel velocity may also be provided. Alternatively, the user may specify the velocity and/or acceleration at which the movable object may be traveling towards the target. Any description herein of affecting the velocity of the movable object may also apply to affecting acceleration of the movable object when moving towards the target. In some instances, the user may affect the velocity at the same time at which the user is specifying the target. For instance, when a user selects a target, the number of clicks or touches that a user touches the target may affect the velocity of the movable object. For instance, if a user touches a point indicative of a target a single time, the movable object may travel at a first velocity, and if the user touches the point multiple times, the movable object may travel at a second velocity. The second velocity may be greater than the first velocity. The velocity of the movable object travel may correspond to the number of touches or selections of the point indicative of the target. A positive proportional relationship may be provided between the number of selections and the velocity of the movable object. In some instances, a linear relationship may be provided between the number of selections and the velocity of the movable object. For instance, if a user clicks on the point/target N times, the velocity of the movable object may be $X+N*Y$, where X is a velocity value, Y is a velocity multiplier, and N is the number of times the target was selected/clicked. Any other mathematical relation may be provided. The user may make a selection a first time to get a first velocity, and then make the selection again to speed up the movable object. The user may keep making the selection to keep speeding up the movable object.

In another example, when a user selects a target, a length of time associated with the selection of the target may affect the velocity of the movable object. For instance, if a user touches a point indicative of a target for a first period of time, the movable object may travel at a first velocity, and if the user touches for a second period of time greater than the first period of time, the movable object may travel a second velocity. The second velocity may be greater than the first velocity. The velocity of the movable object motion may correspond to the length of the touch or selection of the point indicative of the target. A positive proportional relationship may be provided between the length of the selection and the velocity of the movable object. In some instances, a linear relationship may be provided between the length of the selection and the velocity of the movable object.

Various other types of user interactions may affect the velocity of the movable object traveling towards the target. In some examples, swiping motions (e.g., speed of swipe, length of swipes, number of swipes) may affect the velocity of the movable object. In other examples, different regions may be touched to affect the velocity of the movable object. In another example, a separate control may be provided for velocity control. For instance, a user may adjust a velocity using a manual control while the movable object is traveling towards the target. The velocity may be adjusted in accordance with the manual control in real-time. In another example, a user may enter a numerical value for the desired velocity, or select the velocity from a plurality of pre-selected options.

Figure 15:
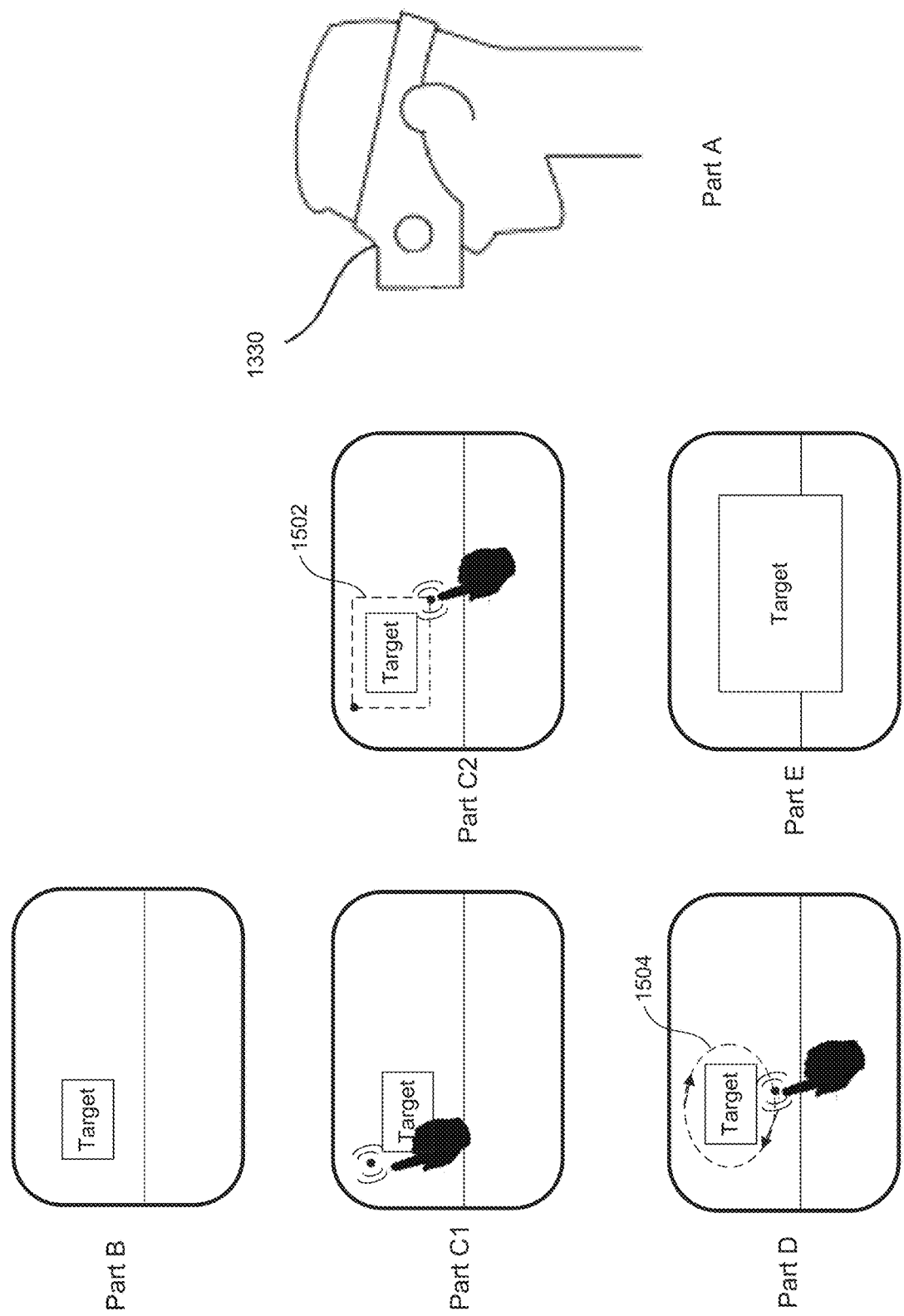
FIG. 15 shows an example of a user interface (UI) in an augmented FPV through which a user may select a target by selecting different points and cause the movable object to move towards or track the target.

FIG. 15 shows an example of a user interface (UI) in an augmented FPV through which a user may select a target by selecting different points and cause the movable object to move towards the target. FIG. 15 is similar to FIG. 14 except for the following differences. In FIG. 15, a user may select a target by touching a plurality of points on the image to generate a box containing the target. Part B shows an initial 3-D FPV of an environment comprising the target. Part C1 shows a user selecting a first point proximate to the target within the initial 3-D FPV. Part C2 shows the user selecting a second point proximate to the target within the initial 3-D FPV. Referring to parts C1 and C2, when the user touches the first point and the second point on the image, a box 1502 may be generated to contain the target therein. The box may be in any shape, for example an n-sided polygon where n may be any integer greater than 2. The box 1502 may be a 4-sided polygon (quadrilateral-shaped). The target may be selected when the target substantially lies within the box in the image. Part D of FIG. 15 shows another way by which a user can select a target. In part D, a user may draw a box around the target on the image by touching the display in a circular manner around the target. The box may contain the target therein. The box may be in any shape, for example an n-sided polygon, an ellipse, an irregular shape, etc. In part D, the box may be an ellipse 1504. The target may be selected when the target substantially lies within the ellipse in the image. Part E shows an image of the target after the movable object has moved towards the target and is at a distance from the target.

Figure 16:
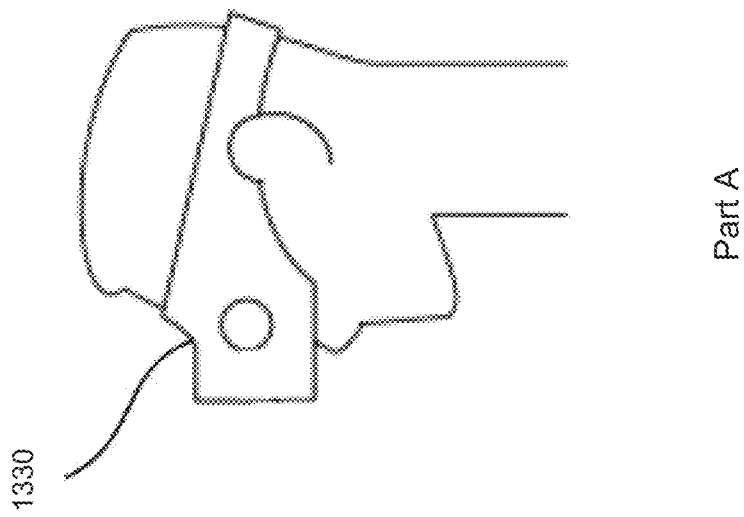
FIG. 16 shows an example of a user interface (UI) in an augmented FPV comprising a 2D overhead map.
Figure 16:
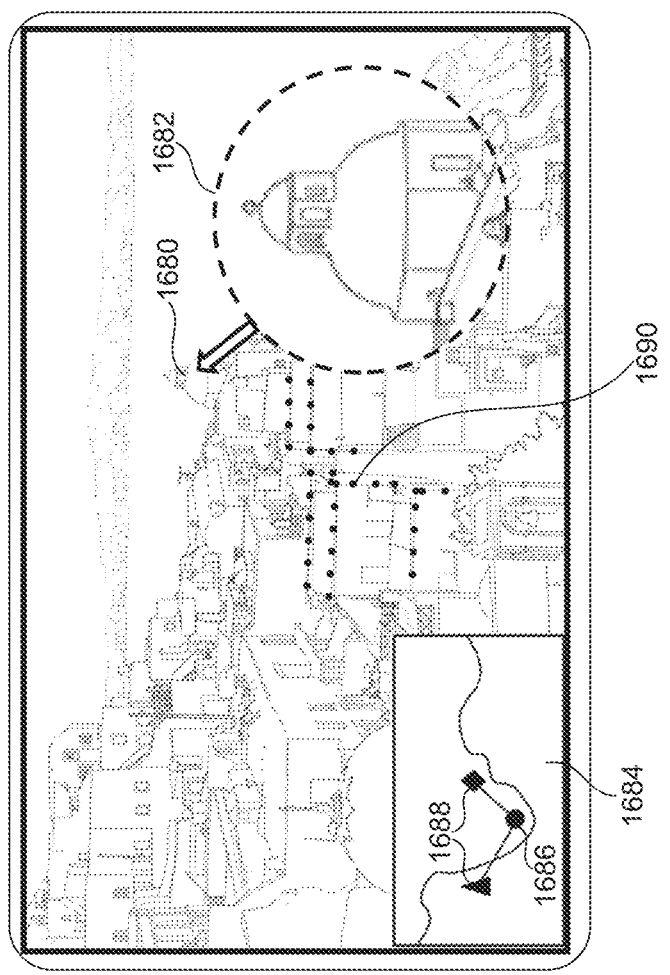

FIG. 16 shows an example of a user interface (UI) in an augmented FPV through which a user may select a target and cause a movable object to move towards the target. A 3-D FPV may include an augmented reality (AR) layer comprising a 2D map 1684 (such as an overhead map) located on a portion (e.g., bottom left corner) of the 3-D FPV. The 3-D FPV may include stereoscopic images or video captured by an imaging device on the movable object. A user may select a target by touching a point 1680 on the image. In some embodiments, a balloon 1682 may be generated to display a magnified view of the target. The target may correspond to a portion of a building, as shown in the balloon. In some embodiments, a user may further refine the target selection by selecting one or more points, or a region, within the balloon. For example, the user may click on a particular feature within the balloon. Alternatively, the user may draw a shape to enclose a region within the balloon. Additionally, the user may zoom in or zoom out of the view that is displayed within the balloon. The user may also navigate in any direction within the view that is displayed within the balloon. In some embodiments, the user may move the balloon around within the image to display magnified views of different parts of the image. As the user is moving the balloon around within the image, the user may notice features or points of interest, and select those features or points of interest to be the target. In some embodiments, a prompt window (not shown) may appear next to the selected point, requesting confirmation from the user on whether the selected point corresponds to an intended target of the user. Once the user confirms the target, the positions of the target and the movable object may be displayed in the 2D map 1684 on the bottom left corner of the 3-D FPV. The 2D map may indicate a location 1686 of the movable object in the environment, as well as locations 1688 of one or more targets in the environment.

The movable object may move towards the target after the user has selected the target. For example, the movable object may move towards the target shown in balloon 1682. The image size of the target in the 3-D FPV may increase as the movable object moves towards the target. The positions of the target and the movable object may also be updated in real-time on the 2D map 1684. For example, as the movable object moves towards the target, a distance between the movable object and target on the 2D map starts to decrease. In some embodiments, a user may select the target from the balloon pre-flight (i.e., prior to operation of the movable object, or when the movable object is hovering at a fixed point). Alternatively, in other embodiments, a user may refine the selection of the target during flight. In some cases, a user may select a new target by selecting a different point in the displayed image (e.g. from the balloon). The displayed image may include more details about (and also around) the original target, when the movable object is flying towards and/or tracking the target. A user may refine his target selection based on the additional details about (and also around) the original target, when the movable object is flying towards and/or tracking the target. For example, the user may select a different point or select a different region to refine his target selection. When the target selection is refined, the movable object may modify its course slightly and fly towards and/or track the refined target. Additionally, a user may select an entirely new target by moving the balloon to another location on the image, while the movable object is in motion. When a new target is selected, the movable object may change course and fly towards and/or track the new target.

In some embodiments, potential obstacles in the motion path of the movable object may be marked up using any warning scheme as described elsewhere herein. In FIG. 16, a series of dots (or wireframe) 1690 may be superposed in the 3-D FPV, along edges of the images of buildings along the motion path of the movable object. The series of dots (or wireframe) 1690 may be used to indicate a potential risk of collision when the movable object is moving near to or above those objects. Any color or shading scheme can be used to indicate the collision risk and to warn a user of impending collision, as described elsewhere herein.

Although various embodiments of the disclosure have been described with reference to a 3-D FPV, it should be appreciated that other types of views may be presented in alternative or in conjunction with the 3-D FPV. For instance, in some embodiments, the map view 1684 in FIG. 16 can be a 3D map instead of a 2D map. The 3D map may be alterable to view the 3D environment from various angles. In some embodiments, the 3D environment may comprise a plurality of virtual objects. The virtual objects may be graphical solid objects or graphical wireframes. The virtual objects may comprise points or objects that may be of interest to a user. Points or objects that may be of less interest to the user may be omitted from the 3D virtual environment to reduce object clutter and to more clearly delineate points/objects of interest. The reduced clutter makes it easier for the user to select or identify a desired point or object of interest from the 3D virtual environment.

Figure 17:
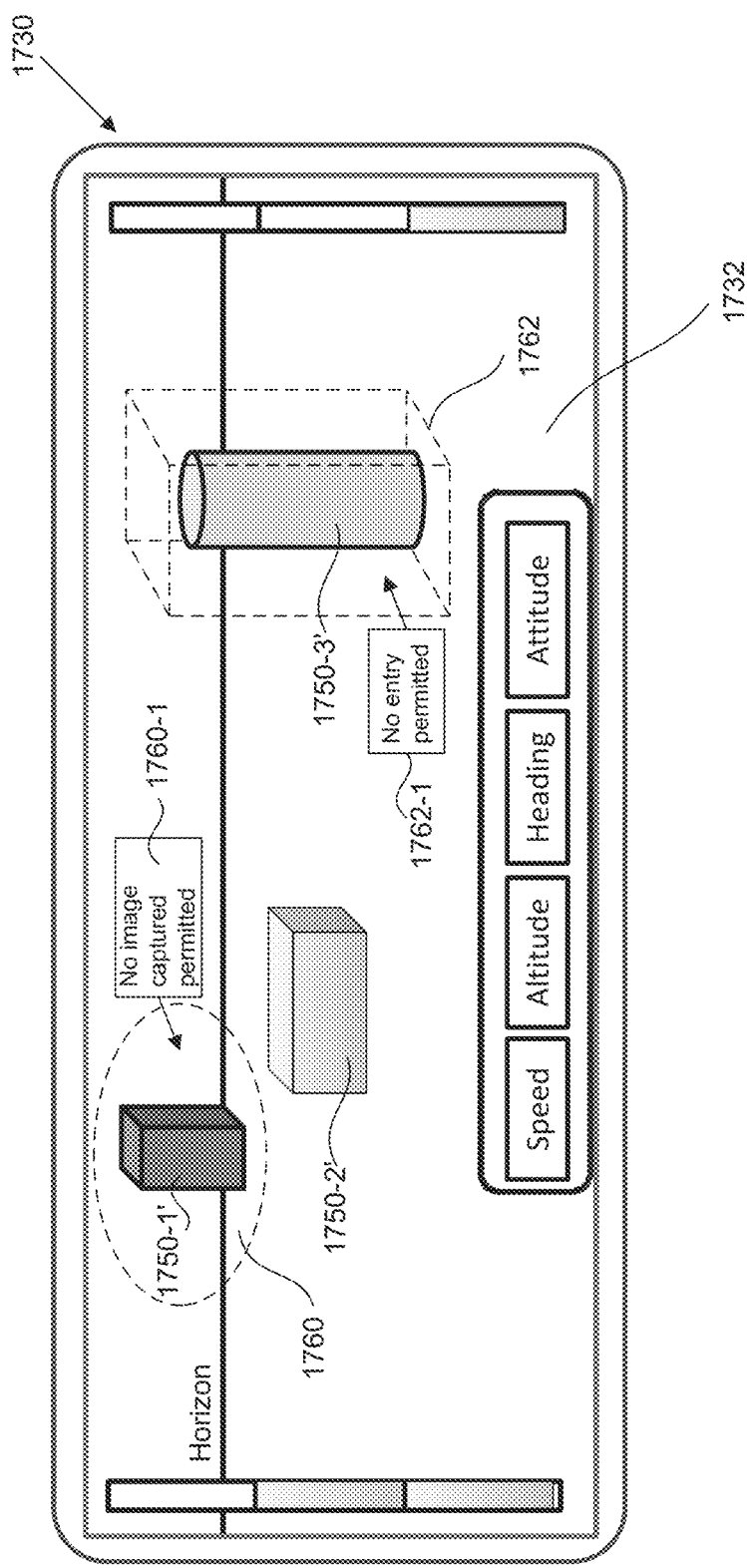
FIG. 17 shows an example of a user interface (UI) in an augmented FPV displaying flight-restricted regions.

FIG. 17 shows an example of a user interface (UI) in an augmented FPV displaying flight-restricted regions, in accordance with some embodiments. FIG. 17 is similar to FIG. 9 except the augmented FPV in FIG. 17 is further configured to display one or more flight-restricted regions. An augmented FPV 1732 of an environment may be displayed on a display device 1730. The FPV may include images 1750-1', 1750-2', and 1750-3' of a first object, second object, and third object, respectively that are located in the environment. A plurality of flight-restriction regions 1760 and 1762 may be displayed in the augmented FPV. The flight-restriction region 1760 may be displayed surrounding the image 1750-1' of the first object. The flight-restriction region 1762 may be displayed surrounding the image 1750-3' of the third object. The flight-restriction regions may be displayed having any visual marking scheme. For example, the flight-restriction regions may be displayed having any shape (e.g., regular or irregular shape), size, dimension, color, in 2-D or 3-D, etc.

In the example of FIG. 17, the FPV may be captured by a camera on a UAV. The UAV may be configured to detect or identify flight-restricted regions from an environmental map as the UAV moves within the environment. The environmental map may be generated onboard the UAV as described elsewhere herein. The locations of one or more flight-restricted regions may be stored on-board the UAV. Alternatively, information about the locations of one or more flight-restricted regions may be accessed from a data source off-board the UAV.

A flight-restricted region may be defined by the boundaries of an airport or any other type of flight-restricted region. A flight-restricted region may include one or more no-fly zones where a UAV is not permitted to fly (e.g., at or near an airport). Alternatively, a flight-restricted region may be a zone where operation of one or more functions of the UAV is being regulated, or being subject to one or more flight regulations. A flight-restricted region may have any location. In some instances, a flight-restricted region location may be a point, or the center or location of the flight-restricted region may be designated by a point (e.g., latitude and longitude coordinates, optionally altitude coordinate). For example, a flight-restricted region location may be a point at the center of an airport, or representative of the airport or other type of flight-restricted region. In other examples, a flight-restricted region location may include an area or region. The area or region may have any shape (e.g., rounded shape, rectangular shape, triangular shape, shape corresponding to one or more natural or man-made feature at the location, shape corresponding to one or more zoning rules), or any other boundaries. A flight-restricted area or region may be displayed as a 2-dimensional shape in the FPV. For example, as shown in FIG. 17, the flight-restricted region 1760 may be in the shape of an ellipse surrounding the image 1750-3' of the first object.

In some instances, a flight-restricted region may include a space. The flight-restricted region may be displayed as a 3-dimensional shape in the FPV. For example, as shown in FIG. 17, the flight-restricted region 1762 may be in the shape of a cuboid surrounding the image 1750-1' of the third object. The cuboid may occupy a space. In some alternative embodiments (not shown), the flight-restricted region 1762 may have an amorphous or irregular 3-dimensional shape. The space may be a three-dimensional space that includes latitude, longitude, and/or altitude coordinates. The three-dimensional space may include length, width, and/or height. The flight-restricted region may include space from the ground up to any altitude above the ground. This may include altitude straight up from one or more flight-restricted region on the ground. For example, for some latitudes and longitudes, all altitudes may be flight restricted. In some instances, some altitudes for particular lateral regions may be flight-restricted, while others are not. For example, for some latitudes and longitudes, some altitudes may be flight restricted while others are not. Thus, the flight-restricted region may have any number of dimensions, and measurement of dimensions, and/or may be designated by these dimension locations, or by a space, area, line, or point representative of the region.

A flight-restricted region may include one or more locations where unauthorized aerial vehicles may not fly. This may include unauthorized unmanned aerial vehicles (UAVs) or all UAVs. Flight-restricted regions may include prohibited airspace, which may refer to an area (or volume) of airspace within which flight of aircraft is not allowed, usually due to security concerns. Prohibited areas may contain airspace of defined dimensions identified by an area on the surface of the earth within which the flight of aircraft is prohibited. Such areas can be established for security or other reasons associated with the national welfare. These areas may be published in the Federal Register and are depicted on aeronautical charts in the United States, or in other publications in various jurisdictions. The flight-restricted region may include one or more of special use airspace (e.g., where limitations may be imposed on aircraft not participating in designated operations), such as restricted airspace (i.e., where entry is typically forbidden at all times from all aircraft and is not subject to clearance from the airspace's controlling body), military operations areas, warning areas, alert areas, temporary flight restriction (TFR) areas, national security areas, and controlled firing areas.

Examples of flight-restricted regions may include, but are not limited to, airports, flight corridors, military or other government facilities, locations near sensitive personnel (e.g., when the President or other leader is visiting a location), nuclear sites, research facilities, private airspace, de-militarized zones, certain jurisdictions (e.g., townships, cities, counties, states/provinces, countries, bodies of water or other natural landmarks), or other types of no-fly zones. A flight-restricted region may be a permanent no-fly zone or may be a temporary area where flight is prohibited. In some instances, a list of flight-restricted regions may be updated. Flight-restricted regions may vary from jurisdiction to jurisdiction. For instance, some countries may include schools as flight-restricted regions while others may not.

The boundaries of the flight-restricted regions may be visually augmented in the FPV, as shown in FIG. 17. In some embodiments, information about flight-restricted regions may be displayed to a user through the augmented FPV while the user is controlling the UAV. The information serves to notify the user about the presence of flight-restricted regions within the environment, that may be in the flight path of the UAV. The information may also include information about the type of flight restrictions imposed on the UAV. For example, as shown in FIG. 17, an alert window 1760-1 may be displayed at or near the flight-restricted region 1760 in the FPV. The alert window may include a message alerting a user that no image capture is permitted by the UAV when the UAV is in the flight-restricted region 1760. As an example, the flight-restricted region 1760 may be located at a military or other government facility that prohibits civilian aircraft from capturing sensitive image data. Based on the information provided by the alert window 1760-1, the user may refrain from capturing images from the UAV when the UAV is within the flight-restricted region 1760. In some cases, the user may turn off (or may be required to turn off) the image function capture of the UAV when the UAV is in the flight-restricted region 1760.

Similarly, an alert window 1762-1 may be displayed at or near the flight-restricted region 1762 in the FPV. The alert window may include a message alerting the user that the UAV is not permitted to enter the flight-restricted region 1762. As an example, the flight-restricted region 1762 may be located at an airport. Based on the information provided by the alert window 1762-1, the user can control the UAV to avoid entering flight-restricted region 1762. For example, the user may maneuver the UAV to avoid crossing into the boundaries of the region 1762

As mentioned above, a user can control a UAV to operate in accordance with the regulations/restrictions imposed by one or more flight-restricted regions, based on information displayed via the augmented FPV. In some embodiments, the UAV may be operated semi-autonomously or autonomously to comply with the regulations/restrictions imposed by one or more flight-restricted regions. For example, one or more processors onboard the UAV (or on a remote terminal) may be configured to generate instructions for autonomously powering off or limiting one or more UAV operational functions (e.g., image capture, data transmission/reception, sound or noise emission, etc.) when the UAV is flying within a flight-restricted region (e.g., military or other government facility). In some instances, the one or more processors may be configured to override user commands when a user attempts to operate the UAV in a manner that is not permitted (e.g., image capture) within a flight-restricted region.

In some embodiments, when a user attempts to fly a UAV into a flight-restricted region that does not permit unauthorized aerial vehicles to enter, one or more processors onboard the UAV (or on a remote terminal) may be configured to override the user's commands. For example, the processors may be configured to generate flight control instructions that cause the UAV to autonomously land prior to, when entering, or after having entered the flight-restricted region. Alternatively, the processors may be configured to modify the user-input flight path such that the UAV autonomously maneuvers around (and does not enter) the flight-restricted region.

Figure 18:
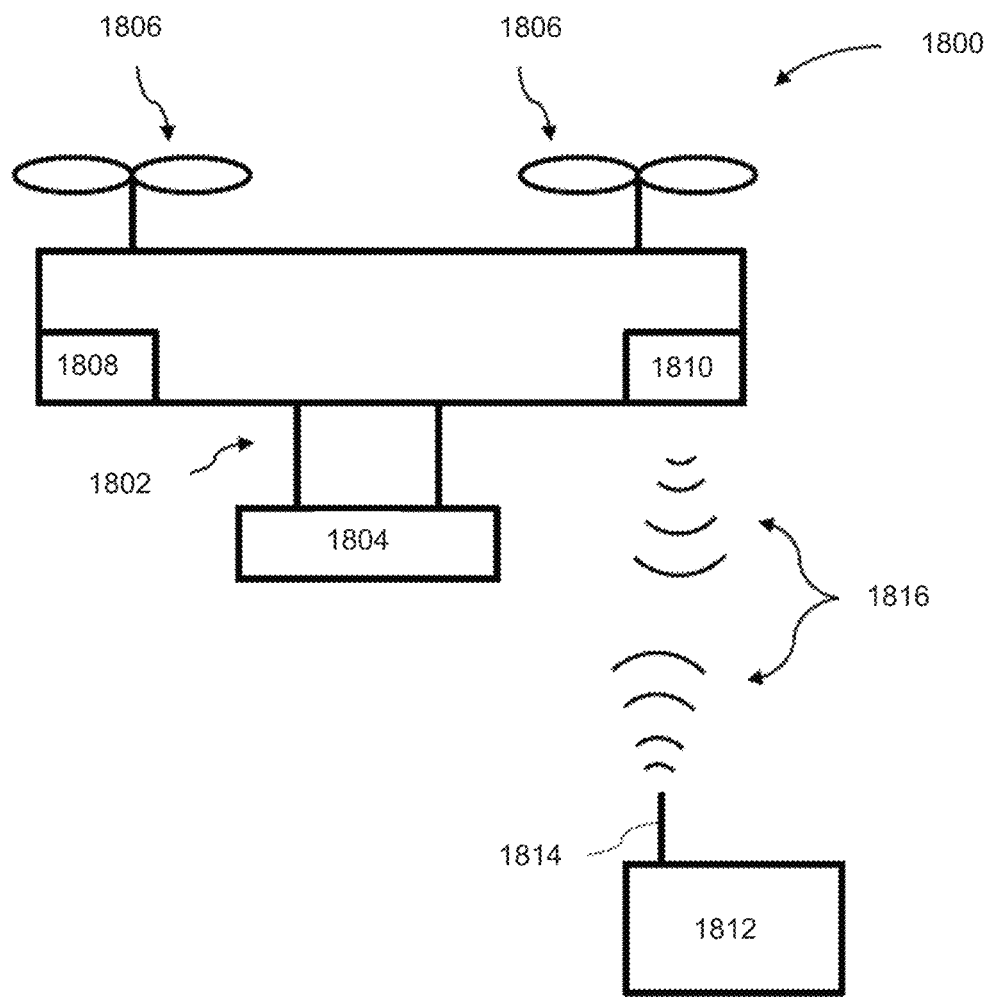
FIG. 18 is a schematic block diagram of a system for controlling a movable object, in accordance with some embodiments.

FIG. 18 illustrates a movable object 1800 including a carrier 1802 and a payload 1804, in accordance with embodiments. Although the movable object 1800 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1804 may be provided on the movable object 1800 without requiring the carrier 1802. The movable object 1800 may include propulsion mechanisms 1806, a sensing system 1808, and a communication system 1810.

The propulsion mechanisms 1806 can include one or more of rotors, propellers, blades, engines, motors, wheels, axles, magnets, or nozzles, as previously described. For example, the propulsion mechanisms 1806 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1806 can be mounted on the movable object 1800 using any suitable means, such as a support element (e.g., a drive shaft) as described elsewhere herein. The propulsion mechanisms 1806 can be mounted on any suitable portion of the movable object 1800, such on the top, bottom, front, back, sides, or suitable combinations thereof.

In some embodiments, the propulsion mechanisms 1806 can enable the movable object 1800 to take off vertically from a surface or land vertically on a surface without requiring any horizontal movement of the movable object 1800 (e.g., without traveling down a runway). Optionally, the propulsion mechanisms 1806 can be operable to permit the movable object 1800 to hover in the air at a specified position and/or orientation. One or more of the propulsion mechanisms 1806 may be controlled independently of the other propulsion mechanisms. Alternatively, the propulsion mechanisms 1806 can be configured to be controlled simultaneously. For example, the movable object 1800 can have multiple horizontally oriented rotors that can provide lift and/or thrust to the movable object. The multiple horizontally oriented rotors can be actuated to provide vertical takeoff, vertical landing, and hovering capabilities to the movable object 1800. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1800 (e.g., with respect to up to three degrees of translation and up to three degrees of rotation).

The sensing system 1008 can include one or more sensors that may sense the spatial disposition, velocity, and/or acceleration of the movable object 1800 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1808 can be used to control the spatial disposition, velocity, and/or orientation of the movable object 1800 (e.g., using a suitable processing unit and/or control module, as described below). Alternatively, the sensing system 1808 can be used to provide data regarding the environment surrounding the movable object, such as weather conditions, proximity to potential obstacles, location of geographical features, location of manmade structures, and the like.

The communication system 1810 enables communication with terminal 1812 having a communication system 1814 via wireless signals 1816. The communication systems 1810, 1814 may include any number of transmitters, receivers, and/or transceivers suitable for wireless communication. The communication may be one-way communication, such that data can be transmitted in only one direction. For example, one-way communication may involve only the movable object 1800 transmitting data to the terminal 1812, or vice-versa. The data may be transmitted from one or more transmitters of the communication system 1810 to one or more receivers of the communication system 1814, or vice-versa. Alternatively, the communication may be two-way communication, such that data can be transmitted in both directions between the movable object 1800 and the terminal 1812. The two-way communication can involve transmitting data from one or more transmitters of the communication system 1810 to one or more receivers of the communication system 1814, and vice-versa.

In some embodiments, the terminal 1812 can provide control data to one or more of the movable object 1800, carrier 1802, and payload 1804 and receive information from one or more of the movable object 1800, carrier 1802, and payload 1804 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1806), or a movement of the payload with respect to the movable object (e.g., via control of the carrier 1802). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1808 or of the payload 1804). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1812 can be configured to control a state of one or more of the movable object 1800, carrier 1802, or payload 1804. Alternatively or in combination, the carrier 1802 and payload 1804 can also each include a communication module configured to communicate with terminal 1812, such that the terminal can communicate with and control each of the movable object 1800, carrier 1802, and payload 1804 independently.

In some embodiments, the movable object 1800 can be configured to communicate with another remote device in addition to the terminal 1812, or instead of the terminal 1812. The terminal 1812 may also be configured to communicate with another remote device as well as the movable object 1800. For example, the movable object 1800 and/or terminal 1812 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1800, receive data from the movable object 1800, transmit data to the terminal 1812, and/or receive data from the terminal 1812. Optionally, the remote device can be connected to the Internet or other telecommunications network, such that data received from the movable object 1800 and/or terminal 1812 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method for generating a first person view (FPV) of an environment, comprising, with aid of one or more processors individually or collectively:

receiving stereoscopic video data of the environment generated by an unmanned aerial vehicle (UAV);

analyzing the stereoscopic video data to determine environmental information; generating an augmented reality (AR) layer that includes the environmental information being configured to assist a navigation of the UAV;

correcting a distortion of images corresponding to the stereoscopic video data based on the environmental information that is obtained through a sensing unit onboard the UAV and includes geometric information about at least one first object within a field of view of an imaging device of the UAV; and aligning the AR layer to the corrected images to generate, on a terminal remote from the UAV, augmented stereoscopic video data of the environment;

wherein:

the AR layer includes displaying information of the at least one first object and displaying information of at least one second object based on the environmental information obtained through the sensing unit onboard the UAV and includes geometric information about at least one second object outside the field of view of the imaging device of the UAV;

the displaying information of the at least one first object includes at least one of warning information associated with the at least one first object, speed information of the at least one first object, or movement direction information of the at least one first object; and the displaying information of the at least one second object includes at least one of a proximity level of the at least one second object or a location side of the at least one second object with respect to the UAV.

2. The method of claim 1, wherein analyzing the stereoscopic video data comprises at least one of stereo matching of image frames or depth map calculation.

3. The method of claim 2, wherein the stereo matching comprises matching of feature points extracted from the image frames based on motion characteristics of the feature points.

4. The method of claim 2, wherein the depth map calculation comprises filtering and applying a threshold to a depth map.

5. The method of claim 4, wherein the threshold is applied to classify objects in the environment having at least one of a predetermined size or a number of pixels in the depth map.

6. The method of claim 1, wherein the environmental information comprises an environmental map, wherein the environmental map comprises a topological map or a metric map.

7. The method of claim 1, wherein the environmental information comprises at least one of:
   relative positions between the UAV and one or more objects in the environment, or relative positions between two or more objects in the environment.

8. The method of claim 1, wherein the environmental information comprises at least one of: a distance of the UAV from a third object in the environment, or an orientation of the UAV relative to the third object, the at least one first object including the third object.

9. The method of claim 8, wherein the UAV is configured to follow or track the third object.

10. The method of claim 8, wherein the third object is an obstacle lying in the motion path of the UAV, and the UAV is configured to avoid the third object.

11. The method of claim 8, wherein the augmented stereoscopic video data of the environment comprises a graphical element associated with the environmental information.

12. The method of claim 11, wherein the graphical element is overlay on the FPV of the environment displayed on the terminal.

13. The method of claim 11, wherein the graphical element is configured to dynamically change as a position or the orientation of the UAV relative to the third object in the environment changes.

14. The method of claim 12, wherein the terminal comprises a head-mounted display (HMD).

15. The method of claim 12, wherein the terminal comprises a pair of virtual reality (VR) or augmented reality (AR) enabled glasses.

16. The method of claim 12, wherein the terminal comprises a mobile device mounted onto a foldable headgear, the mobile device having a graphical display configured to display the FPV.

17. The method of claim 12, wherein the terminal allows a user to control and navigate the UAV from the first person view (FPV).

18. The method of claim 1, further comprising incorporating the environmental information into the stereoscopic video data to fuse the stereoscopic video data and the environmental information.

19. The method of claim 1, wherein:
   the AR layer further includes displaying information of a reference line that extends across the FPV and is relative to a horizontal line of the FPV; and
   the method further comprises, in response to a change in a pitch and/or roll of the UAV, obtaining updated environmental information to generate updated AR layer, the updated AR layer including updated displaying information of the reference line indicative of a change in an orientation of the reference line relative to the horizontal line.

20. An apparatus for generating a first person view (FPV) of an environment comprising one or more processors that are individually or collectively configured to:
   receive stereoscopic video data of the environment generated by an unmanned aerial vehicle (UAV);
   analyze the stereoscopic video data to determine environmental information;
   generate an augmented reality (AR) layer that includes the environmental information being configured to assist a navigation of the UAV;
   correct a distortion of images corresponding to the stereoscopic video data based on the environmental information that is obtained through a sensing unit onboard the UAV and includes geometric information about at least one first object within a field of view of an imaging device of the UAV; and
   align the AR layer to the corrected images to fuse the stereoscopic video data and the environmental information to generate, on a terminal remote from the UAV, augmented stereoscopic video stream of the environment;
   wherein:
   the AR layer includes displaying information of the at least one first object and displaying information of at least one second object based on the environmental information obtained through the sensing unit onboard the UAV and including geometric information about the at least one second object outside the field of view of the imaging device of the UAV;
   the displaying information of the at least one first object includes at least one of warning information associated with the at least one first object, speed information of the at least one first object, or movement direction information of the at least one first object; and
   the displaying information of the at least one second object includes at least one of a proximity level of the at least one second object or a location side of the at least one second object with respect to the UAV.

\* \* \* \* \*